United States Patent [19]
Itoh

[11] Patent Number: 5,218,478
[45] Date of Patent: Jun. 8, 1993

[54] SMALL-SIZED ZOOM LENS

[75] Inventor: Yoshinori Itoh, Kanagawa, Japan

[73] Assignee: Canon Kabushiki Kaisha, Tokyo, Japan

[21] Appl. No.: 614,591

[22] Filed: Nov. 13, 1990

[30] Foreign Application Priority Data

Nov. 17, 1989 [JP] Japan ................... 1-299173
Nov. 17, 1989 [JP] Japan ................... 1-299174
Dec. 15, 1989 [JP] Japan ................... 1-325016

[51] Int. Cl.[5] .................. G02B 15/14; G02B 13/18
[52] U.S. Cl. .......................... 359/692; 359/715; 359/716; 359/717
[58] Field of Search .............. 350/423, 426, 427; 359/692, 715, 716, 717

[56] References Cited

U.S. PATENT DOCUMENTS

| | | | |
|---|---|---|---|
| 4,400,064 | 8/1983 | Ikamori et al. | 350/426 |
| 4,469,412 | 9/1984 | Tajima et al. | 350/426 |
| 4,560,253 | 12/1985 | Ogino | 350/426 |
| 4,953,957 | 9/1990 | Kobayashi | 359/692 |
| 5,071,235 | 12/1991 | Mori et al. | 359/692 |

FOREIGN PATENT DOCUMENTS

| | | |
|---|---|---|
| 57-201213 | 12/1982 | Japan . |
| 62-56917 | 9/1985 | Japan . |
| 60-170816 | 9/1985 | Japan . |
| 60-191216 | 9/1985 | Japan . |
| 62-251710 | 11/1987 | Japan . |
| 63-276013 | 11/1988 | Japan . |

Primary Examiner—Scott J. Sugarman
Attorney, Agent, or Firm—Fitzpatrick, Cella, Harper & Scinto

[57] ABSTRACT

A zoom lens comprises, from front to rear, a first lens unit of positive power and a second lens unit of negative power with the limitation of the total number of lens elements to 4 or less, the first and second lens units axially moving in differential relation to effect zooming. By properly setting the refractive power arrangement of all the lens units and the spacings between the lens elements and by introducing an aspheric surface, the zoom lens is well corrected for high optical performance, although the total number of lens elements is few.

27 Claims, 15 Drawing Sheets

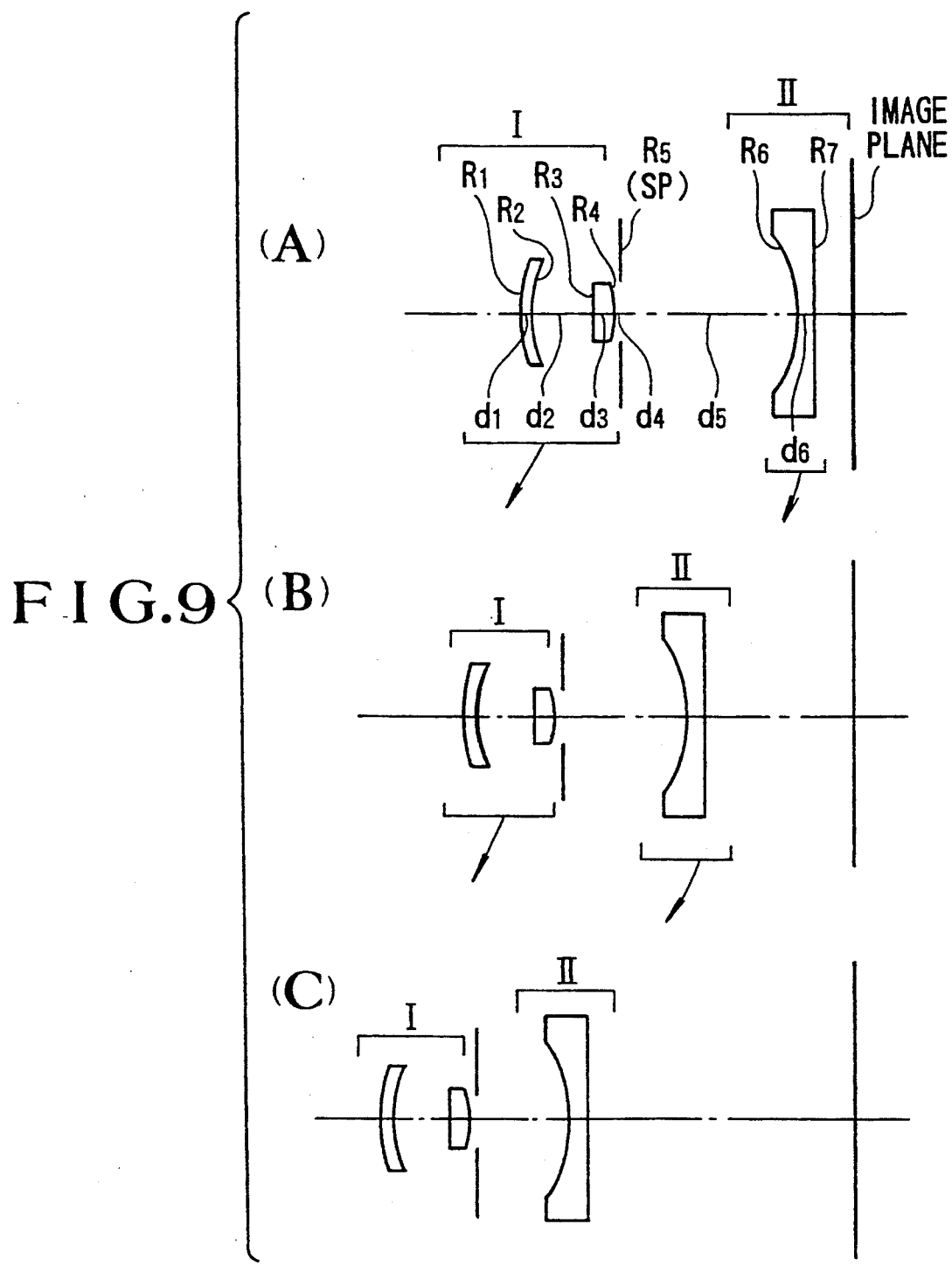

SMALL-SIZED ZOOM LENS

BACKGROUND OF THE INVENTION

1. Field of the Invention

This invention relates to zoom lenses composed of two lens units in simple form suited to lens-shutter cameras, video cameras, etc. and, more particularly, to zoom lenses of shortened total length (distance from the first lens surface to the image plane) in simple form with the number of lens members in each of the lens units being extremely reduced and the aberrations being well corrected.

2. Description of the Related Art

Along the progress of minimization of the size of the lens-shutter camera or video camera have come an increasing number of proposals for zoom lenses of short total length and simple form.

In, for example, Japanese Laid-Open Patent Applications Nos. Sho 57-201213, Sho 60-170816, Sho 60-191216 and Sho 62-56917, the zoom lens is constructed with a first lens unit, when counted from the object side, of positive refractive power and a second lens unit of negative refractive power, totaling two lens units, both lens units moving in differential relation to effect variation of the magnification. Thus, the size is reduced.

Using such a power arrangement, the prior art in these documents has realized a zoom lens of relatively shortened back focal distance, while still maintaining high optical performance to be achieved with the limitation of the total length to a minimum.

Besides this, a zoom lens comprising a first lens unit of positive refractive power and a second lens unit of negative refractive power with the separation between both lens unit being varied to vary the magnification is proposed in, for example, Japanese Laid-Open Patent Application No. Sho 62-251710. In the same document, the first lens unit is constructed from three lenses or in the form of the triplet type, and the second lens unit from two lenses, or a positive lens and a negative lens. The five lenses as a whole constitute a zoom lens having a zoom ratio of about 1.5 and a simple form.

Also, in Japanese Laid-Open Patent Application No. Sho 63-276013, the first lens unit is constructed from two lenses, or a negative lens and a positive lens, and the second lens unit from two lenses, or a positive lens and a negative lens, totaling four lenses. Of these, a plurality of lenses are gradient-index lenses. With these, a zoom lens having a zoom ratio of about 2 and a simple form is produced.

In general, in the above-described type of zoom lens, or the type having only two lens units, to afford a simplification of the lens form, it is recommended that each lens group is constructed with as few a number of lenses as possible.

However, to allow the prescribed zoom ratio and photographic image angle to be obtained within this framework, proper rules of design for the individual lens units must be set forth. Otherwise, the range of variation of all aberrations with zooming would increase. So, these would become difficult to correct well.

Also, the proposal of the aforesaid Japanese Laid-Open Patent Application No. Sho 63-276013, or the method of simplifying the lens form by using the gradient-index lenses, is associated with a difficult problem of manufacturing gradient-index lenses in tight tolerances.

SUMMARY OF THE INVENTION

An object of the invention is to provide a zoom lens having two lens units in which all the lens elements are made from usual, or uniform-index, materials, and proper rules of design for the individual lens elements in every lens unit are set forth so that with the prescribed zoom ratio and photographic image angle kept hold of, a simplification of the lens form is achieved while still permitting maintenance of good optical performance throughout the entire zooming range.

BRIEF DESCRIPTION OF THE DRAWINGS

FIGS. 1, 2, 5, 6, 9 and 10 are longitudinal section views of numerical examples 1, 2, 3, 4, 5 and 6 of zoom lenses of the invention respectively.

Figure 1:
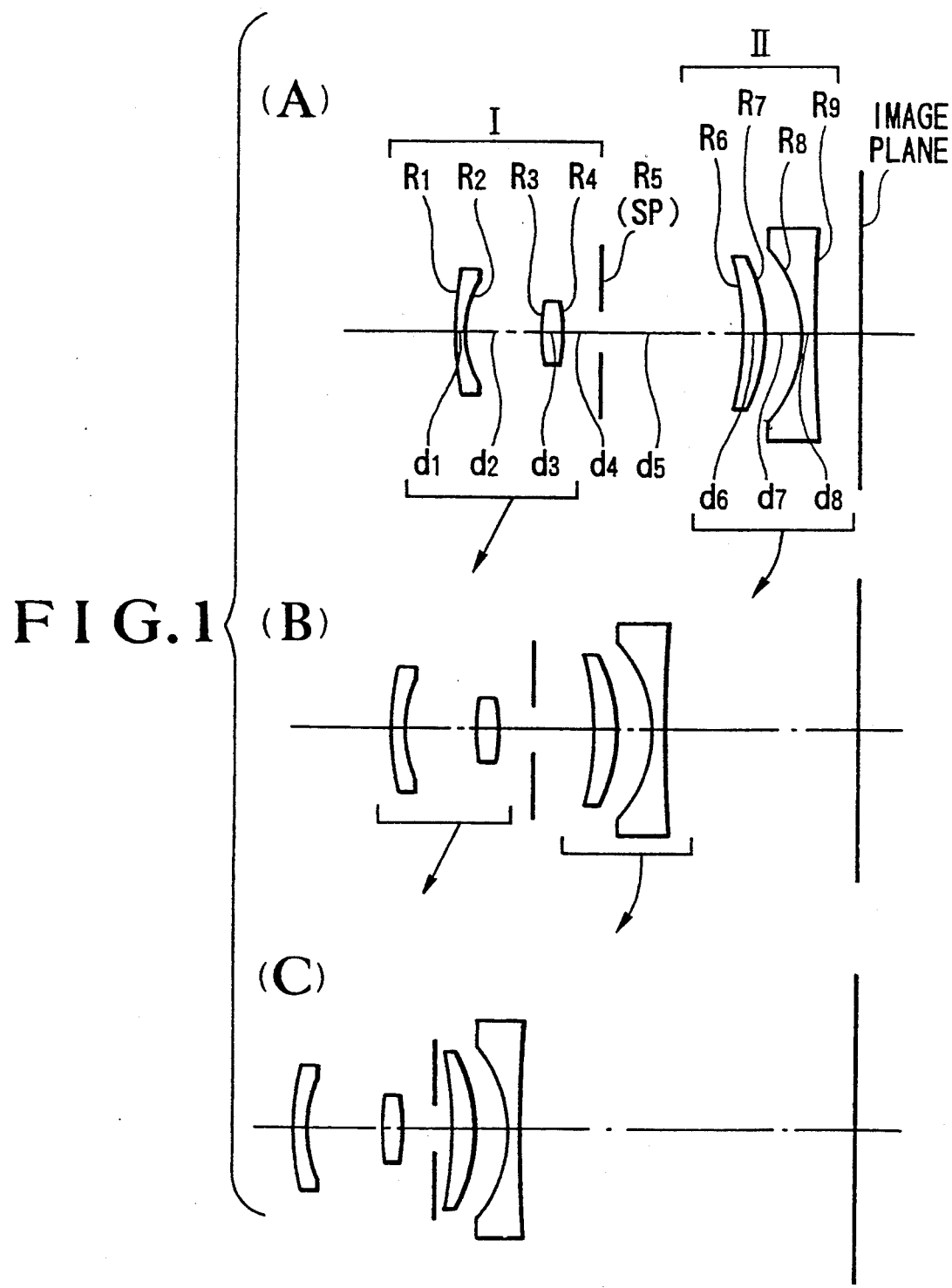
Figure 2:
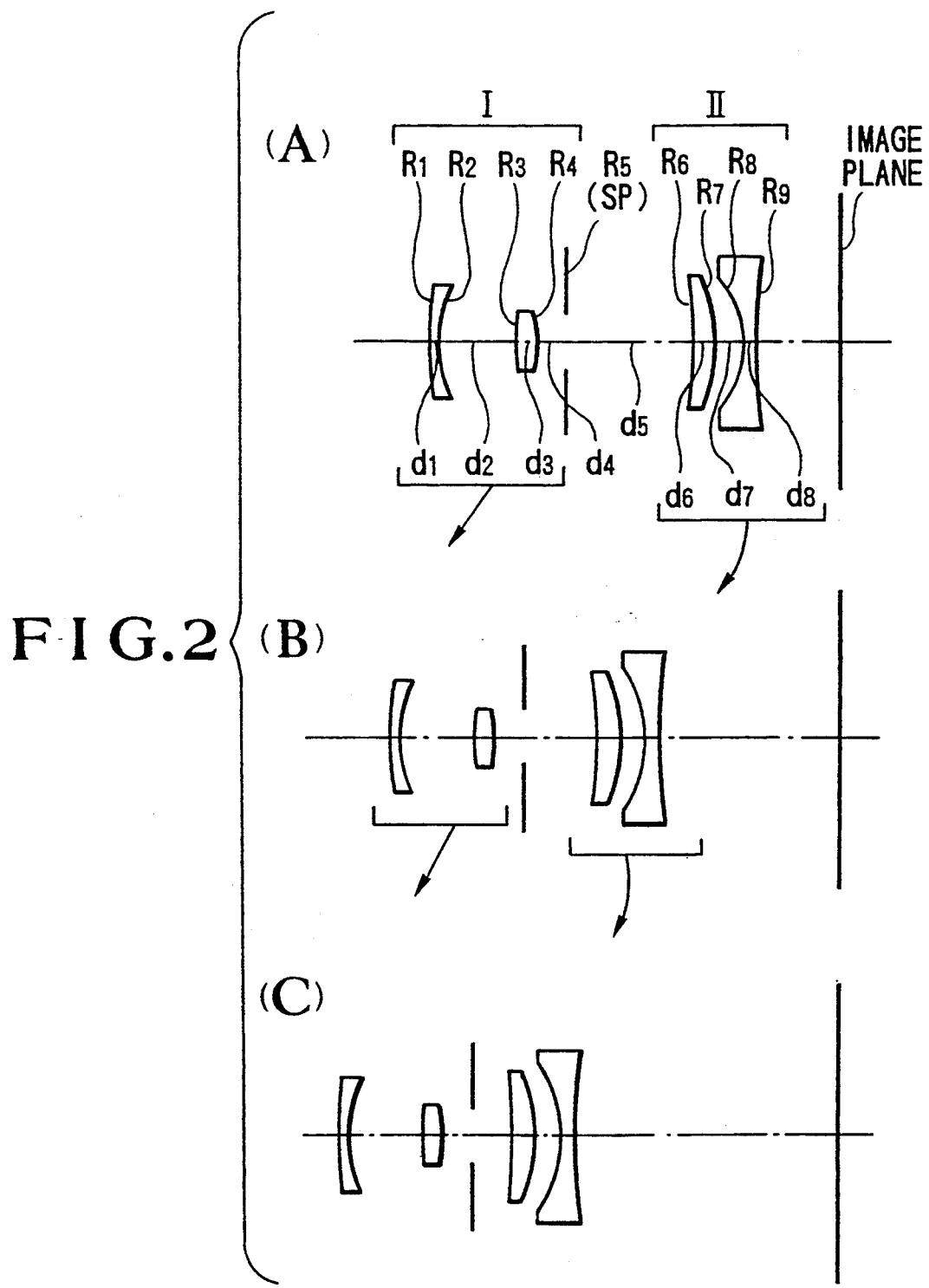
Figure 3A:
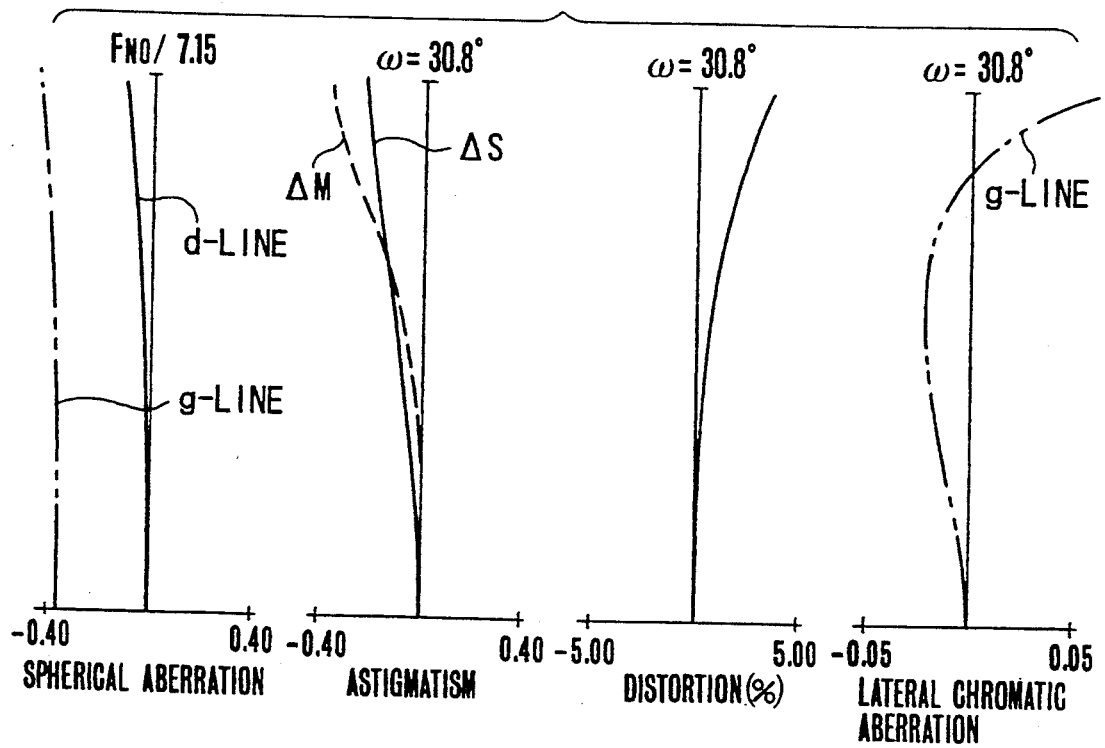
FIGS. 3(A), 3(B) and 3(C), FIGS. 4(A), 4(B) and 4(C), FIGS. 7(A), 7(B) and 7(C), FIGS. 8(A), 8(B) and 8(C), FIGS. 11(A), 11(B) and 11(C), and FIGS. 12(A), 12(B) and 12(C) are graphic representations of the aberrations of the numerical examples 1 to 6 respectively. Of the aberration curves, the ones suffixed (A) are in the wideangle end, the ones suffixed (B) in the intermediate position, and the others suffixed (C) in the telephoto end.
Figure 3B:
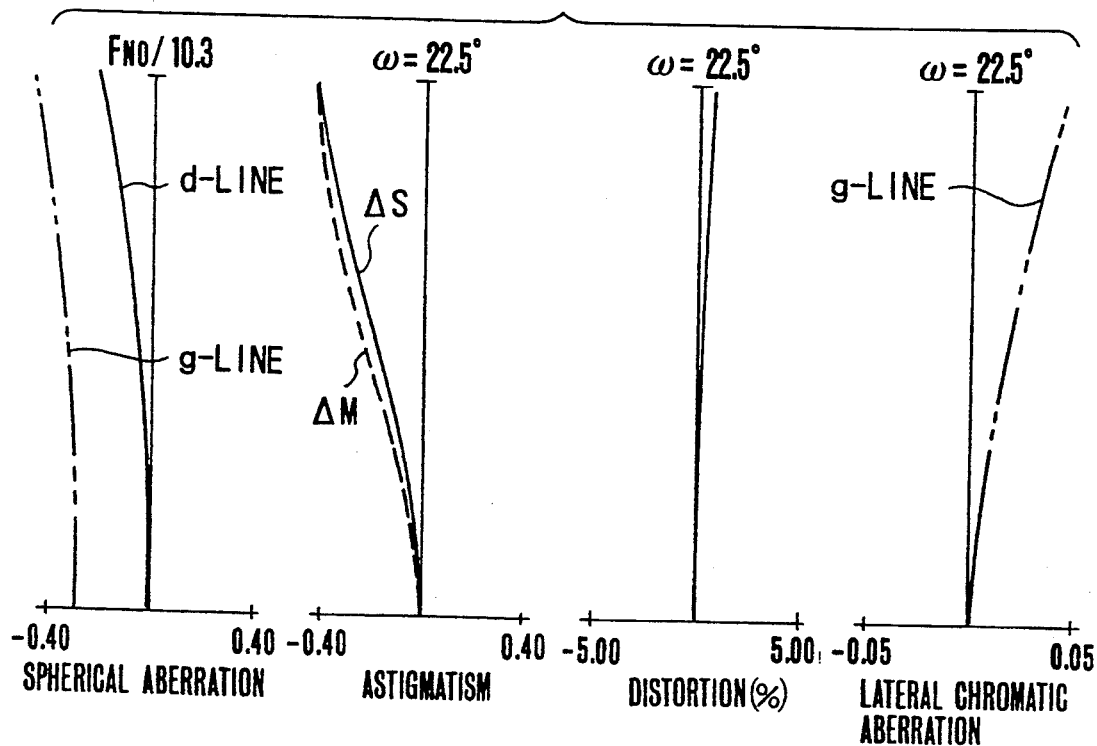
Figure 3C:
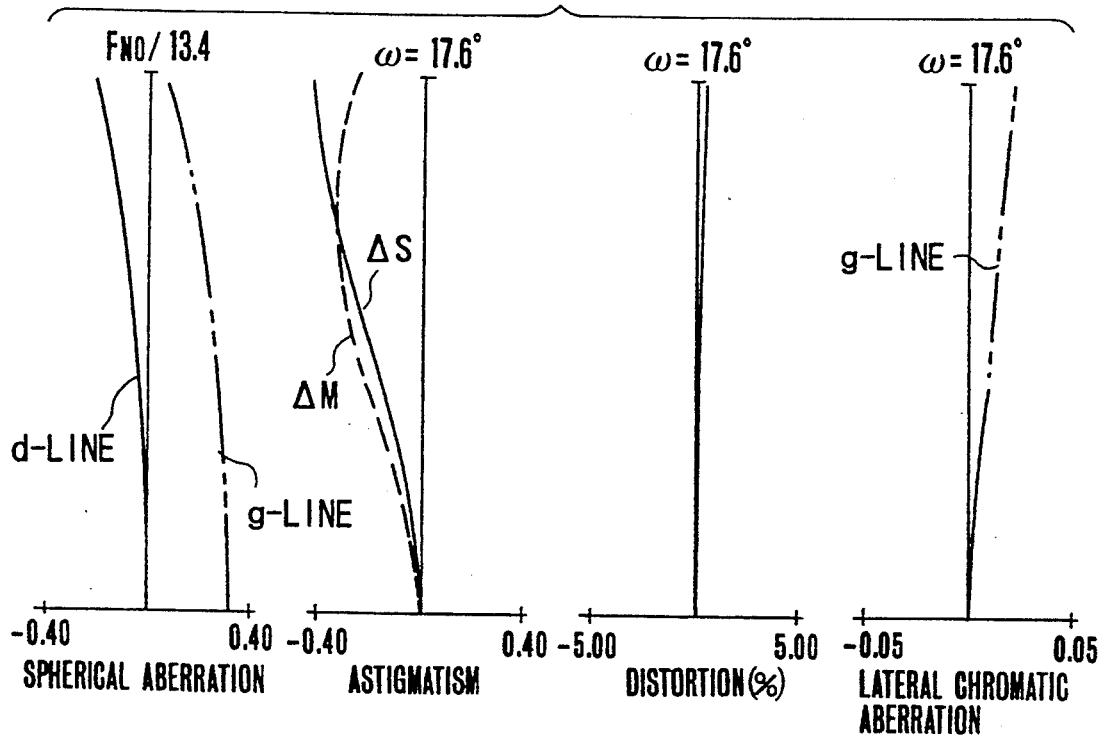
Figure 4A:
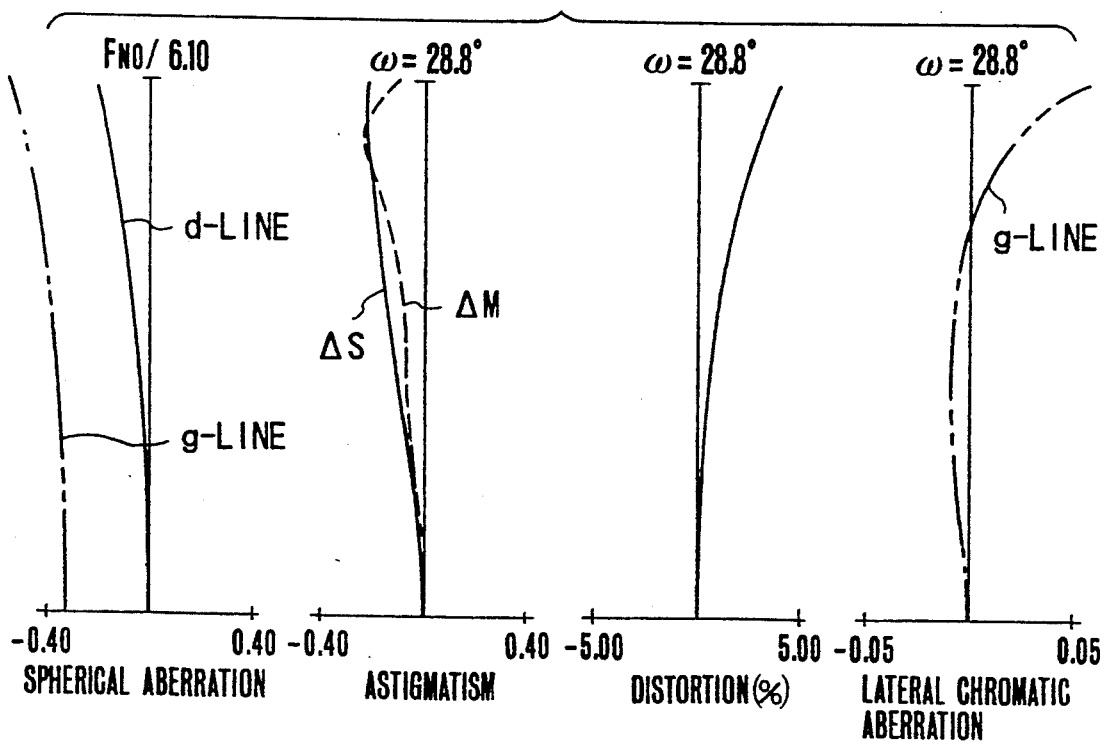
Figure 4B:
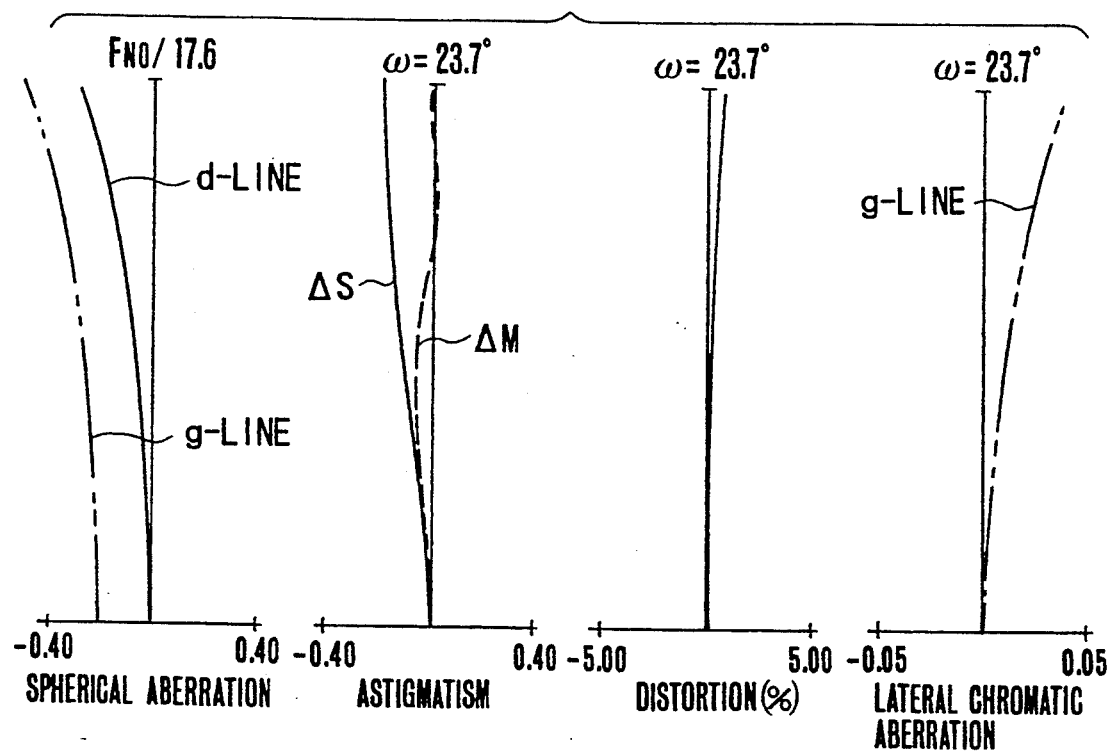
Figure 4C:
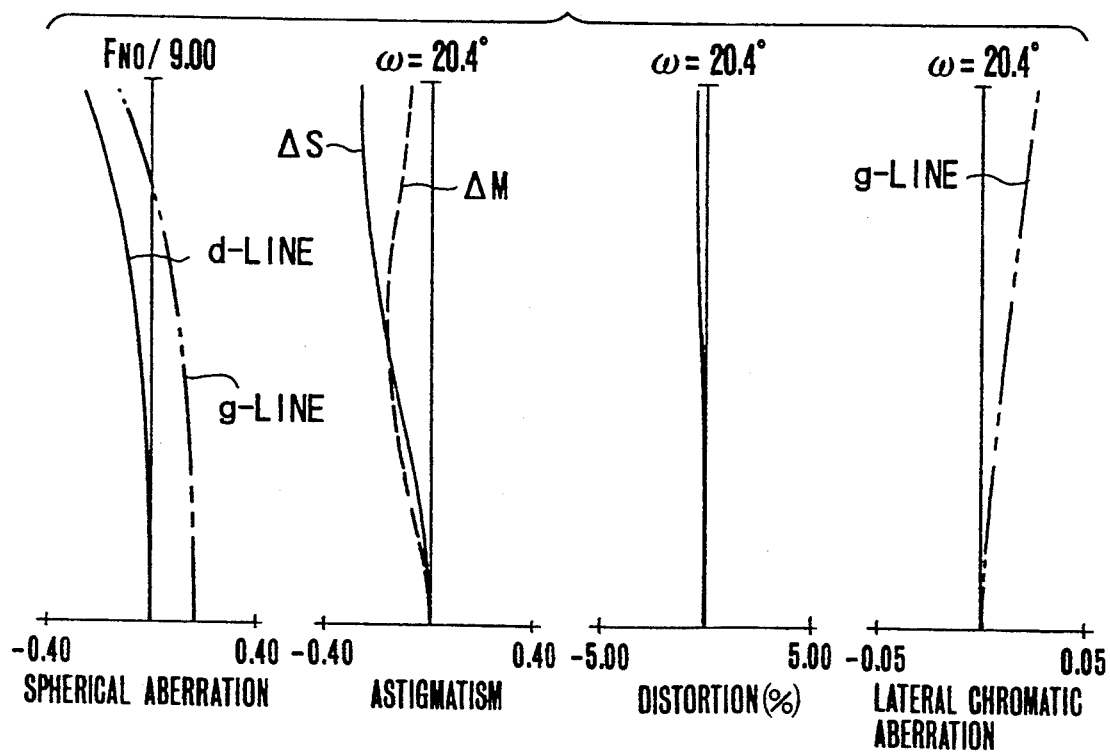

In the drawings, I and II denote the first and second lens units respectively, SP stands for the stop, and the arrows indicate the moving directions of the lens units when zooming. Detailed Description of the Preferred Embodiments:

FIG. 1 and FIG. 2 are lens block diagrams of the numerical examples 1 and 2 of the invention each in the wide-angle end (A), an intermediate position (B) and the telephoto end (C).

In these figures, Roman numeral I denotes a first lens unit having a positive refractive power and having an aspheric surface applied in the front lens surface, and II denotes a second lens unit having a negative refractive power. Both lens units move forward as shown by arrows, while decreasing their spacing, when zooming from the wide-angle end to the telephoto end. SP stands for the stop.

With the use of such a zoom type and refractive power arrangement, the present embodiment achieves a shortening of the total length of the lens in the entire zooming range, or a shortening of the total length particularly at the wide-angle end.

The present embodiment has features that the first lens unit is constructed from a negative first lens and a positive second lens in this order from the front, and the second lens unit from a positive third lens and a negative fourth lens, satisfying the following conditions:

$$0.4 < F1/FW < 1.2 \tag{1}$$

$$-1.5 < F2/FW < -0.5 \text{ em} \tag{2}$$

$$\nu 11 < 40 \tag{3}$$

$$50 < \nu 12 \tag{4}$$

where F1 and F2 are the focal lengths of the first lens unit and the second lens unit respectively, FW is the shortest focal length of the entire lens system, and $\nu 11$ and ν12 are the Abbe numbers of the materials of the first lens and the second lens respectively.

The inequalities of condition (1) give a range for the refractive power of the first lens unit and the inequalities of condition (2) give a range for the refractive power of the second lens unit. In view of the configuration that both of the lens units are moved to vary the focal length, the conditions (1) and (2) have an aim to make a good compromise, among the requirements of minimizing the size of the entire lens system, of getting a prescribed zoom ratio and of lessening the variation of aberrations.

When the refractive power of every lens group is so strong that it exceeds the lower limit of the condition (1) or the upper limit of the condition (2), it is easy to obtain the prescribed zoom ratio, but the field curvature and coma become difficult to adequately correct over the entire zooming range.

When the refractive power of every lens unit is so weak that it exceeds the upper limit of the condition (1) or the lower limit of the condition (2), the back focal distance becomes too short, and the effective diameter of the second lens unit increases. To secure the prescribed zoom ratio, the total movement of each lens unit also increases, which in turn objectionably increases the total length of the zoom lens.

As the negative first and positive second lenses of the first lens unit are made from uniform-index materials and have respectively the meniscus form convex toward the object side and the bi-convex form, the conditions (3) and (4) properly set the Abbe numbers of the materials of these two lenses with a main aim of well correcting the longitudinal chromatic aberration.

When either of the conditions (3) or (4) is violated, a variation of the longitudinal chromatic aberration with zooming begins to increase objectionably.

To easily obtain the prescribed zoom ratio while still maintaining the shortening of the total length of the lens to be achieved, the present embodiment sets forth another condition as follows:

$$1.7 < eW/eT < 2.7 \qquad (5)$$

where eW and eT are the intervals between the principal points of the first and second lens units in the wide-angle end and in the telephoto end respectively.

The inequalities of condition (5) give a proper range for the principal point intervals of the first and second lens units in the wide-angle lend and in the telephoto end and have an aim that, within the framework of the conditions (1) and (2), the zoom ratio gets a predetermined value, for example, 2, while maintaining the shortening of the total length of the lens to be achieved.

When either of the upper or lower limits of the condition (5) is exceeded, it becomes difficult to obtain the prescribed zoom ratio while maintaining the shortening of the total length of the lens to be achieved.

For a good correction of aberrations, particularly curvature of field, as the first lens and the second lens are made from uniform-index materials having refractive indices n11 and n12 respectively, the present embodiment sets forth the following conditions:

$$1.56 < n11 < 1.65 \qquad (6)$$

$$n12 < 1.52 \qquad (7)$$

When the refractive indices of the materials of the first lens and the second lens fall outside the ranges given by the conditions (6) and (7) respectively, the Petzval sum increases largely, and the astigmatism also comes to increase largely. So, that is not good.

In addition to this, with regard to the aberration correction, it is especially preferred in the present embodiment to satisfy the following condition:

$$0.3 < (RB+RA)/(RB-RA) < 1.2 \qquad (8)$$

where RA and RB are the radii of curvature of the front and rear surfaces of the fourth lens constituting part of the second lens unit of negative power respectively.

The inequalities of condition (8) have an aim to correct the various aberrations of the entire area of the image frame in good balance over the entire zooming range. When the upper limit or the lower limit is exceeded, it becomes difficult to maintain the optical performance of the whole image frame in good balance.

Besides this, in the present embodiment, to maintain good optical performance of the whole image frame throughout the entire zooming range, it is recommended to apply to the front side or rear side of the first lens in the first lens unit an aspheric surface of such shape that the negative refractive power gets progressively stronger from the center of the lens to the marginal zone. Specifically speaking, letting the 4th-order aspheric coefficient of that aspheric surface be denoted by B and the diagonal length of the effective image frame by Y, the following condition is satisfied:

$$1 < |B \cdot Y^3| < 15 \qquad (9)$$

Here, when the aspheric surface is applied to the front lens surface of the first lens, the aspheric coefficient B is given negative sign, or when applied to the rear lens surface, the aspheric coefficient B is given positive sign.

When the upper limit of the inequalities of condition (9) is exceeded, the aspheric surface produces an insufficient effect, so that the field curvature becomes difficult to correct well. When the lower limit is exceeded, the aspheric surface produces too strong an effect to avoid over-correction of field curvature. So, that is not good.

It should be noted in connection with the numerical examples 1 and 2 to be described later that the first lens is made from plastic and formed to an aspheric lens. Thus, a zoom lens well corrected for field curvature is obtained.

Besides this, in the present embodiment, to facilitate the minimization of the bulk and size of the whole lens system in such a manner that all aberrations are corrected in good balance, it is preferred to modify the before-described conditions (1) to (4) as follows:

$$0.6 < F1/FW < 1.2$$

$$-1.3 < F2/FW < -0.7$$

$$\nu 11 < 38$$

$50 < \nu12$

Next, the numerical examples 1 and 2 of the invention are shown. In the numerical examples, Ri is the radius of curvature of the i-th lens surface, when counted from the front, di is the i-th axial lens thickness or air separation, when counted from the front, and Ni and νi are respectively the refractive index and Abbe number of the glass of the i-th lens, when counted from the front.

The shape of an apsheric surface is expressed in the coordinates with an X axis in the axial direction and an H axis in a direction perpendicular to the optical axis, the advancing direction of light being taken as positive, by the following equation:

$$X = \frac{(1/R)H^2}{1 + \sqrt{1 - (H/R)^2} + DH^8 + EH^{10}} + AH^2 + BH^4 + CH^6$$

where R is the radius of the osculating sphere and A, B, C, D and E are the aspheric coefficients.

The values of the factors in the before-described conditions (1) to (19) for the numeral examples 1 and 2 are also listed in Table 1.

Numerical Example 1 (FIGS. 1, 3(A), 3(B) and 3(C))

F = 36.2 — 68    FNo = 1:7.15 — 13.4    2ω = 61.6° — 35.2°

| | | | | | | |
|---|---|---|---|---|---|---|
| *R 1 = | 37.03 | d 1 = | 1.5 | N 1 = 1.58376 | ν 1 = 30.2 |
| R 2 = | 19.33 | d 2 = | 10.72 | | |
| R 3 = | 50.21 | d 3 = | 3.0 | N 2 = 1.48749 | ν 2 = 70.2 |
| R 4 = | −16.78 | d 4 = | 4.69 | | |
| R 5 = | (Stop) | d 5 = | Variable | | |
| R 6 = | −69.26 | d 6 = | 3.0 | N 3 = 1.60311 | ν 3 = 60.7 |
| R 7 = | −24.34 | d 7 = | 4.89 | | |
| R 8 = | −18.27 | d 8 = | 2.0 | N 4 = 1.79952 | ν 4 = 42.2 |
| R 9 = | 7480.58 | | | | |

Lens Separation during Zooming

| Focal Length | 36.19 | 52.12 | 68.04 |
|---|---|---|---|
| d5 | 19.93 | 8.54 | 2.48 |

First Surface: Aspheric Surface; Ascpheric Coefficients
A = 0                B = −5.74 × 10⁻⁵
C = −2.77 × 10⁻⁷     D = 1.23 × 10⁻⁹
E = −1.24 × 10⁻¹¹

Numerical Example 2 (FIGS. 2, 4(A), 4(B) and 4(C))

F = 39.3 — 58    FNo = 1:6.1 — 9    2ω = 57.6° — 40.8°

| | | | | | | |
|---|---|---|---|---|---|---|
| *R 1 = | 40.65 | d 1 = | 1.20 | N 1 = 1.58376 | ν 1 = 30.2 |
| R 2 = | 19.43 | d 2 = | 10.94 | | |
| R 3 = | 45.42 | d 3 = | 3.0 | N 2 = 1.48749 | ν 2 = 70.2 |
| R 4 = | −17.09 | d 4 = | 3.95 | | |
| R 5 = | (Stop) | d 5 = | Variable | | |
| R 6 = | −115.95 | d 6 = | 3.0 | N 3 = 1.56384 | ν 3 = 60.7 |
| R 7 = | −22.63 | d 7 = | 3.91 | | |
| R 8 = | −16.38 | d 8 = | 2.0 | N 4 = 1.70154 | ν 4 = 41.2 |
| R 9 = | 219.48 | | | | |

Lens Separation during Zooming

| Focal Length | 39.29 | 49.11 | 57.99 |
|---|---|---|---|
| d5 | 17.94 | 10.49 | 5.92 |

First Surface: Aspheric Surface; Aspheric Coefficients
A = 0                B = −5.94 × 10⁻⁵
C = −3.17 × 10⁻⁷     C = 3.84 × 10⁻⁹
E = −3.69 × 10⁻¹¹

TABLE 1

| Condition No. | Factor | Numerical Example 1 | Numerical Example 2 |
|---|---|---|---|
| (1) | F1/FW | 0.92 | 0.84 |
| (2) | F2/FW | −1.12 | −1.13 |
| (3) | ν11 | 30.2 | 30.2 |
| (4) | ν12 | 70.2 | 70.2 |
| (5) | eW/eT | 2.42 | 1.85 |
| (6) | n11 | 1.58 | 1.58 |
| (7) | n12 | 1.49 | 1.49 |
| (18) | $\frac{RB + RA}{RB - RA}$ | 0.995 | 0.86 |
| (9) | $\|B \cdot Y^3\|$ | 4.65 | 4.81 |

Figure 5:
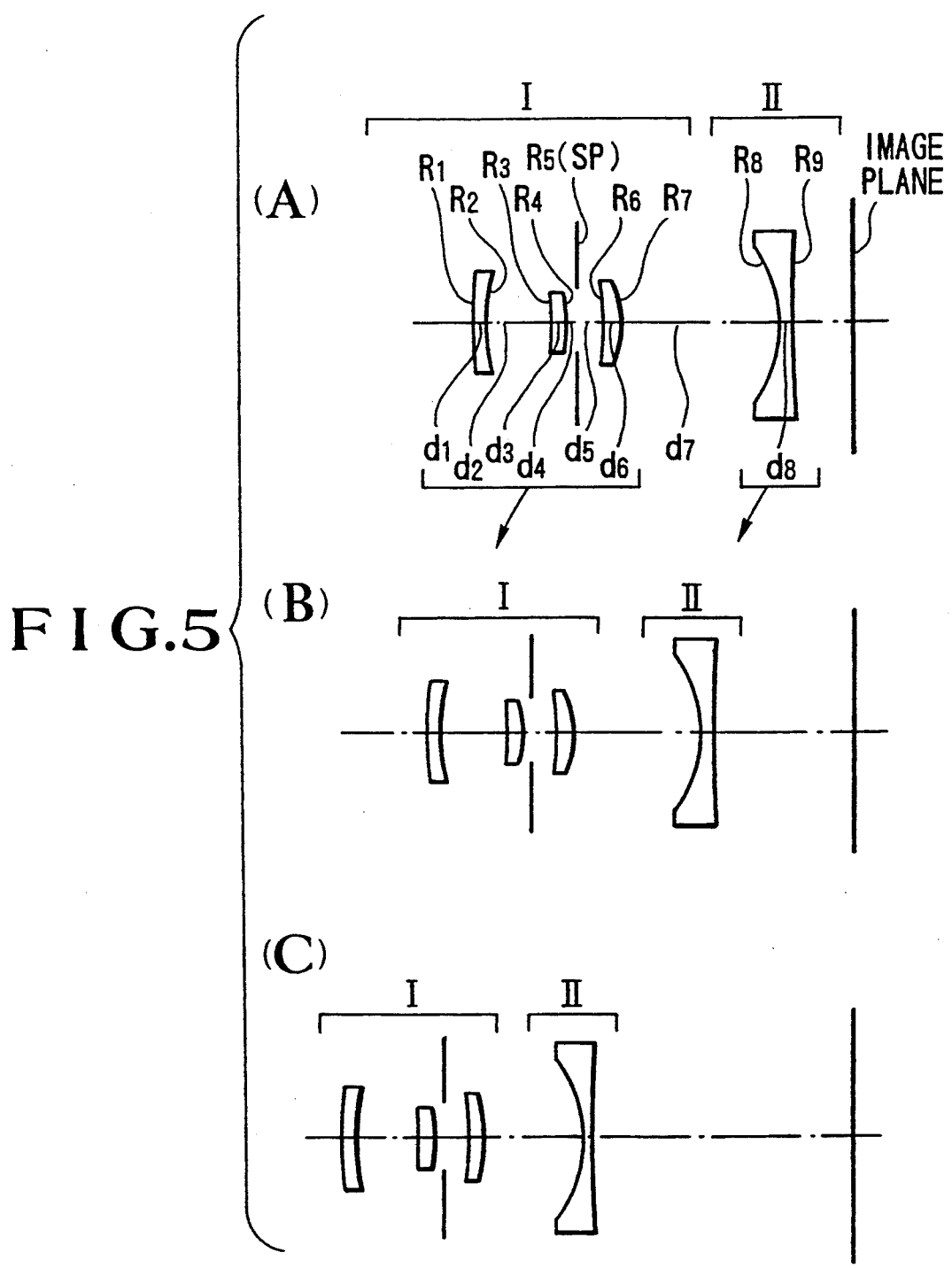
Figure 6:
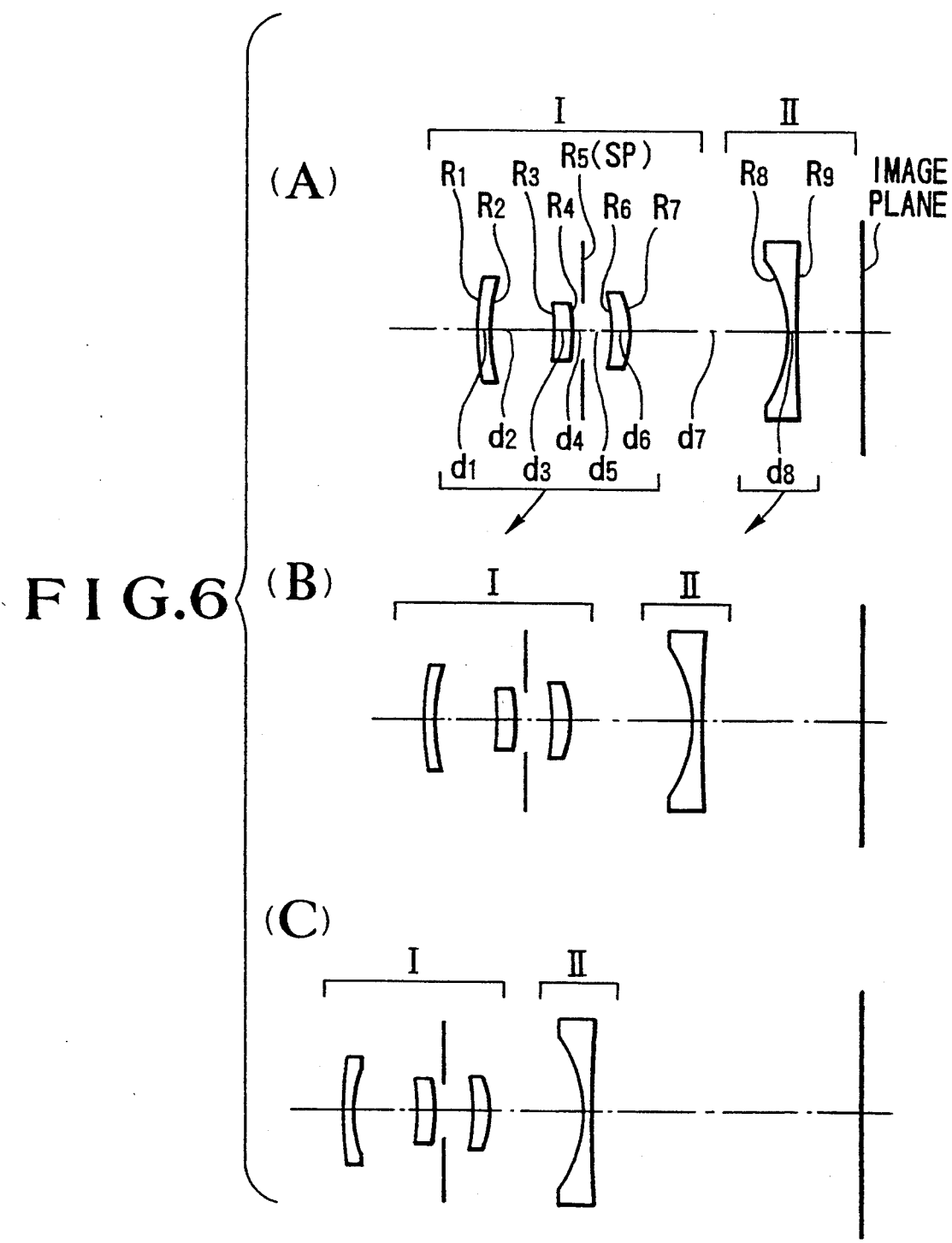
Figure 7A:
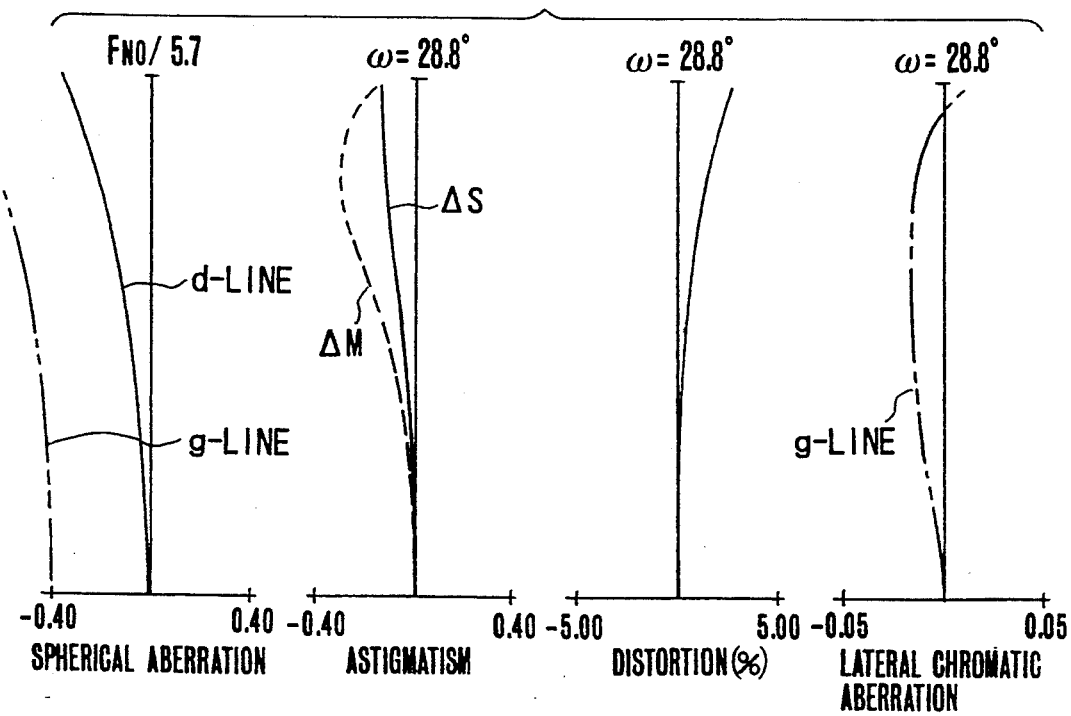
Figure 7B:
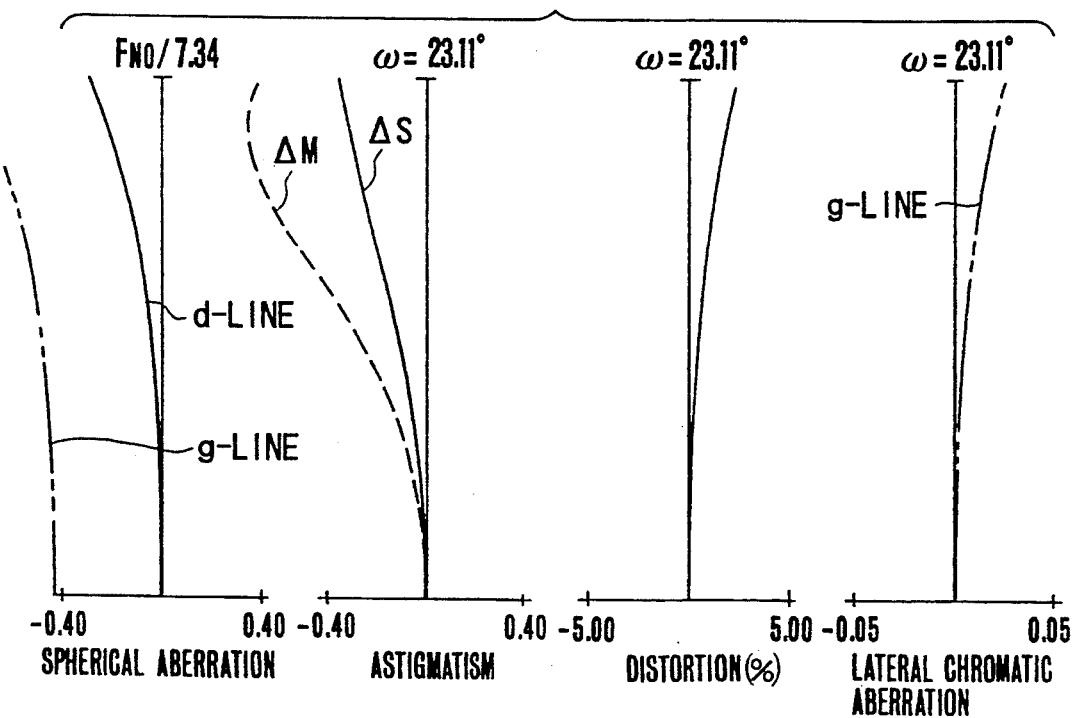
Figure 7C:
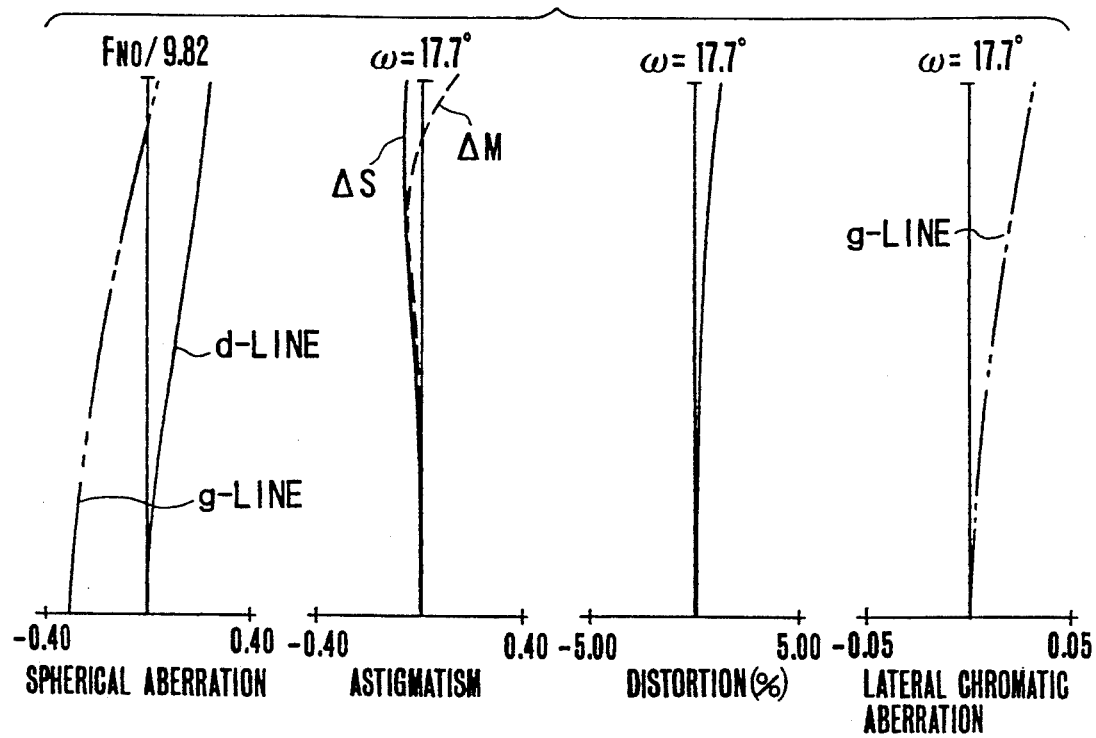
Figure 8A:
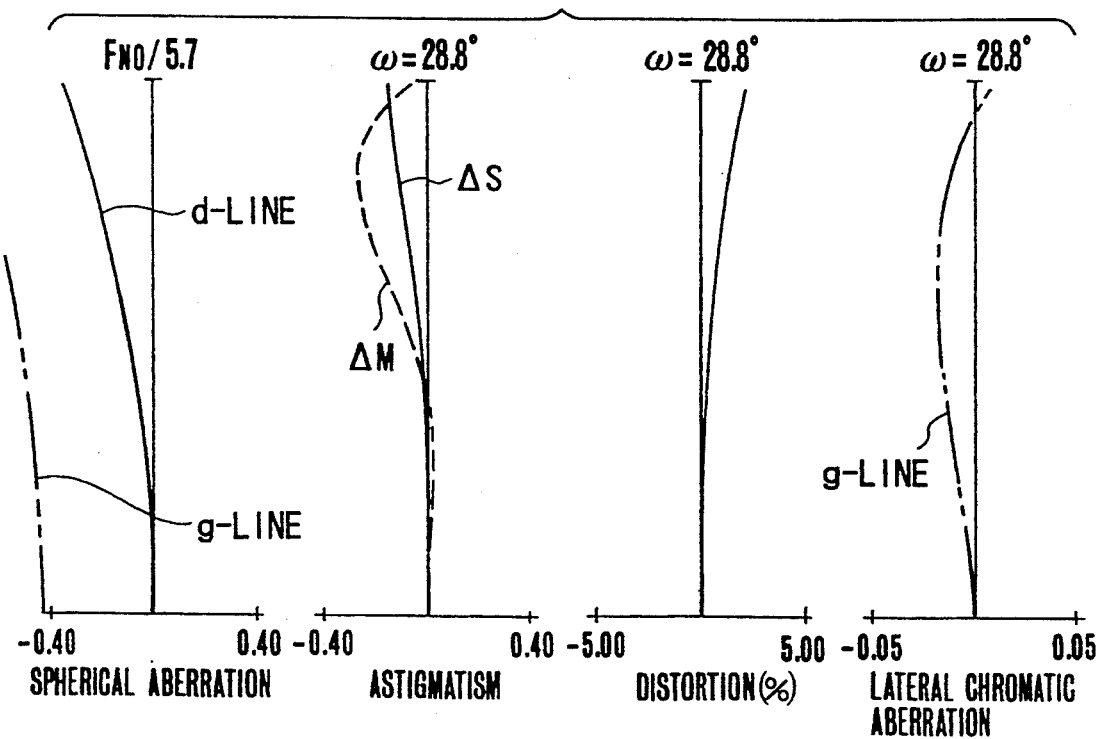
Figure 8B:
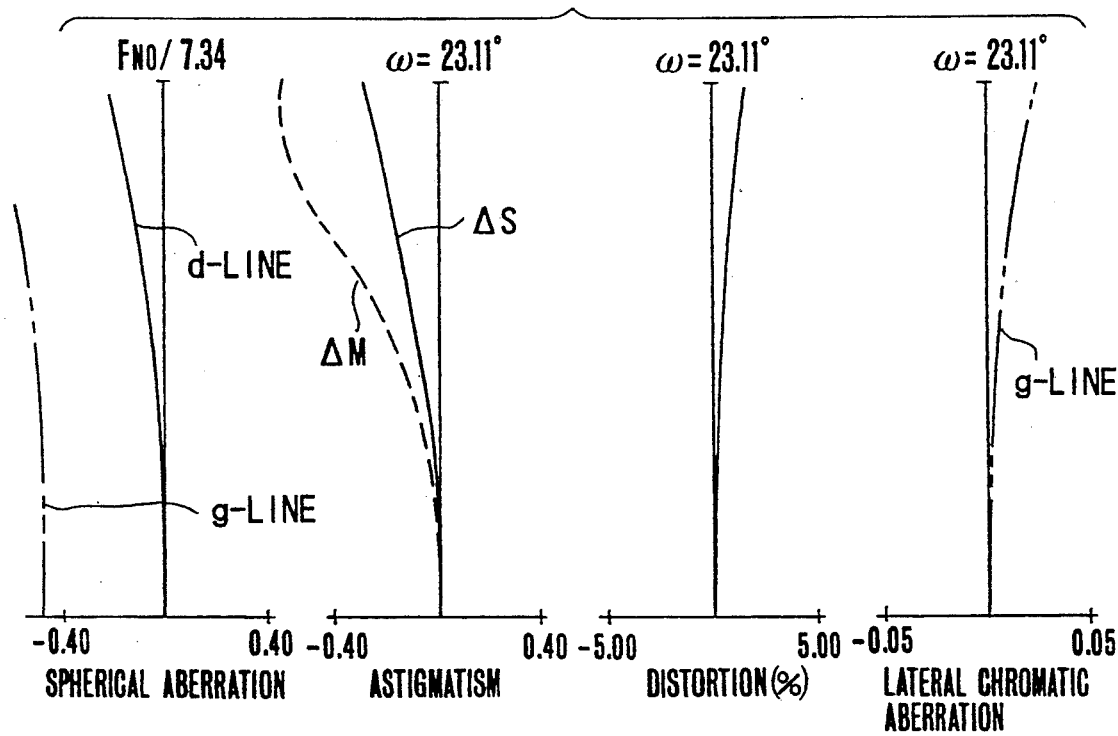
Figure 8C:
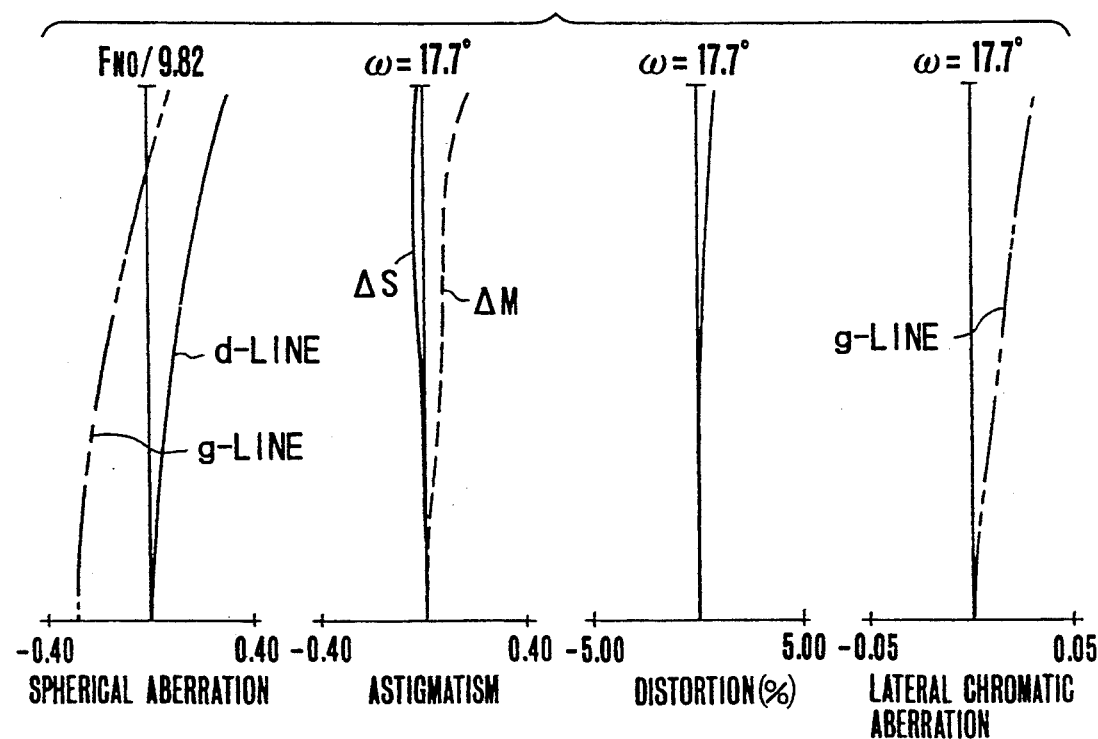

The next embodiment shown in FIG. 5 and FIG. 6, though, as far as the total number of lens elements is concerned, it is similar to the preceding embodiment, or it is four, has the number of lens elements in the first lens unit changed to three and the number of lens elements in the second lens unit to only one, and attains a good optical performance.

In the present embodiment, the first lens unit is constructed from a negative first lens, a positive second lens and a positive third lens in this order from the front, and the second lens unit is constructed from a negative fourth lens, and, letting the i-th lens thickness or air separation, when counted from the front, in the wide-angle end be denoted by Di, and the shortest focal length of the entire lens system by FW, the following condition is satisfied:

$$0.1 < (D3 + D4 + D5)/FW < 0.5 \quad (10)$$

It is to be noted here that in the drawings, with respect to the stop SP in the space between the second lens and the third lens, the distance from the second lens to the stop is denoted by d4, the distance from the stop to the front surface of the third lens is denoted by d5, and the axial thickness of the third lens is denoted by d6. In the above-described condition (10), the air separation D4 corresponds to the sum of the distances d4 and d5, and the lens thickness D5 corresponds to the thickness d6.

By using such a construction and arrangement, a zoom lens having a zoom ratio of about 1.7 with the photographic image angle ranging 58°–35° or thereabout and having good optical performance over the entire zooming range and comprising four lens elements in total is obtained.

In particular, the first lens unit is made to include, with the stop SP sandwiched, the positive second lens on the object side and the positive third lens on the image side. The entire lens system, therefore, gets a nearly symmetric form with respect to the stop over the entire zooming range. This produces an advantage that all aberrations are corrected in good balance, particularly that, instead of employing the method of completing the correction of chromatic aberrations in each individual lens unit, the chromatic aberrations are corrected in good balance over the lens system as a whole.

The technical significance of the above-described condition is explained below.

The inequalities of condition (10) give a proper range for the axial thickness from the front lens surface of the second lens to the rear lens surface of the third lens in the first lens unit and have an aim to well correct aberrations, chiefly coma in the telephoto end, while still maintaining the minimization of the bulk and size of the entire lens system to be achieved.

When the upper limit of the condition (10) is exceeded, the diameter of the front lens increases largely, contributing to a large increase of the bulk and size of the whole lens system. When the lower limit is exceeded, it becomes difficult to well correct coma in the telephoto end.

To correct chiefly curvature of field well over the entire zooming range, while still maintaining the minimization of the bulk and size of the entire lens system, the present embodiment sets forth another condition as follows:

$$0.06 < (D1+D2)/FW < 0.7 \qquad (11)$$

The inequalities of condition (11) are concerned with the length equal to the sum of the axial thickness of the first lens and the axial air separation between the first lens and the second lens. When the upper limit is exceeded, the diameter of the front lens (the effective diameter of the first lens) increases largely. When the lower limit is exceeded, it becomes difficult to well correct curvature of field over the entire zooming range.

To improve the optical performance on the telephoto side, while securing the prescribed zoom ratio, the present embodiment sets forth still another condition for the air separation D6T between the first and second lens units in the telephoto end as follows:

$$0.1 < D6T/FW < 0.6 \qquad (12)$$

When the upper limit of the condition (12) is exceeded, the total zooming movement of the second lens unit is decreased to thereby increase the difficulty of securing the prescribed zoom ratio. When the lower limit is exceeded, the amount of coma produced on the telephoto side increases objectionably.

Besides these, in the present embodiment, it is preferred on the aberration correction that the third lens in the first lens unit is formed to a meniscus shape convex toward the image side with the radii of curvature RA and RB of its front and rear surfaces satisfying the following condition:

$$(RB+RA)/(RB-RA) < -0.5 \qquad (13)$$

When the inequality of condition (13) is violated, good correction of coma on the telephoto side, in particular, becomes difficult to perform.

Also, in the present embodiment, it is preferred to make the first lens from plastic and apply to at least one of its front and rear surfaces an aspheric sphere of such shape that the negative refractive power gets progressively stronger toward the marginal zone of the lens, when the aberrations, chiefly field curvature, are well corrected over the entire zooming range.

It should be noted in the present embodiment that, in order to afford an efficient minimization of the bulk and size of the entire lens system with maintenance of good stability of optical performance throughout the entire zooming range, it is better to tighten the ranges defined in the before-described conditions (10) to (12) as follows:

$$0.15 < (D3+D4+D5)/FW < 0.35$$

$$0.17 < (D1+D2)/FW < 0.4$$

$$0.2 < D6T/FW < 0.5$$

Next, numerical examples 3 and 4 of the invention are shown. The symbols used in these numerical examples have the same meanings as those described above.

The values of the factors int he before-described conditions (10) to (13) for the numerical examples 3 and 4 are listed in Table-2.

| | Numerical Example 3 (FIGS. 5, 7(A), 7(B) and 7(C)) | | | | | |
|---|---|---|---|---|---|---|
| | F = 39.3 − 67.8 | FN0 = 1:5.7 − 9.8 | | 2ω = 57.6° − 35.4° | | |
| *R 1 = | 57.39 | d 1 = | 1.5 | N 1 = 1.58306 | ν 1 = 30.2 |
| R 2 = | 27.91 | d 2 = | 9.18 | | |
| R 3 = | 2156.21 | d 3 = | 2.0 | N 2 = 1.49700 | ν 2 = 81.6 |
| R 4 = | −19.37 | d 4 = | 1.5 | | |
| R 5 = | (Stop) | d 5 = | 3.5 | | |
| R 6 = | −51.94 | d 6 = | 2.0 | N 3 = 1.48749 | ν 3 = 70.2 |
| R 7 = | −18.69 | d 7 = | Variable | | |
| R 8 = | −20.67 | d 8 = | 1.7 | N 4 = 1.71299 | ν 4 = 53.8 |

-continued

| R 9 = | 497.96 | | | |
|---|---|---|---|---|

Lens Separation During Zooming

| focal Length | 39.30 | 50.69 | 67.77 |
|---|---|---|---|
| d7 | 21.59 | 16.98 | 12.98 |

R1: Aspheric Surface; Aspheric Coefficients
A = 0         B = $-6.24 \times 10^{-5}$
C = $8.33 \times 10^{-8}$    D = $-9.04 \times 10^{-9}$
E = $8.76 \times 10^{-11}$

Numrical Example 4 (FIGS. 6, 8(A), 8(B) and 8(C))

F = 39.3 — 67.8    FNo = 1:5.7 — 9.8    2ω = 57.6° — 35.4°

| *R 1 = | 37.20 | d 1 = | 1.5 | N 1 = 1.58306 | ν 1 = 30.2 |
|---|---|---|---|---|---|
| R 2 = | 21.12 | d 2 = | 9.37 | | |
| R 3 = | −659.33 | d 3 = | 2.5 | N 2 = 1.49700 | ν 2 = 81.6 |
| R 4 = | −19.37 | d 4 = | 1.5 | | |
| R 5 = | (Stop) | d 5 = | 4.0 | | |
| R 6 = | −51.76 | d 6 = | 2.0 | N 3 = 1.51633 | ν 3 = 64.1 |
| R 7 = | −18.55 | d 7 = | Variable | | |
| R 8 = | −21.58 | d 8 = | 1.7 | N 4 = 1.77250 | ν 4 = 49.6 |
| R 9 = | −2190.87 | | | | |

Lens Separation during Zooming

| Focal Length | 39.30 | 52.45 | 67.70 |
|---|---|---|---|
| d7 | 22.37 | 17.12 | 13.58 |

R1: Aspheric Surface; Aspheric Coefficients
A = 0         B = $-5.88 \times 10^{-5}$
C = $-1.38 \times 10^{-8}$    D = $-5.05 \times 10^{-9}$
E = $3.38 \times 10^{-11}$

TABLE 2

| Condition No. | Factor | Numerical Example 3 | Numerical Example 4 |
|---|---|---|---|
| (10) | (D3 + D4 + D5)/Fw | 0.23 | 0.25 |
| (11) | (D1 + D2)/Fw | 0.27 | 0.28 |
| (12) | D6T/Fw | 0.33 | 0.35 |
| (13) | $\frac{RB + RA}{RB - RA}$ | −2.14 | −2.12 |

Figure 10:
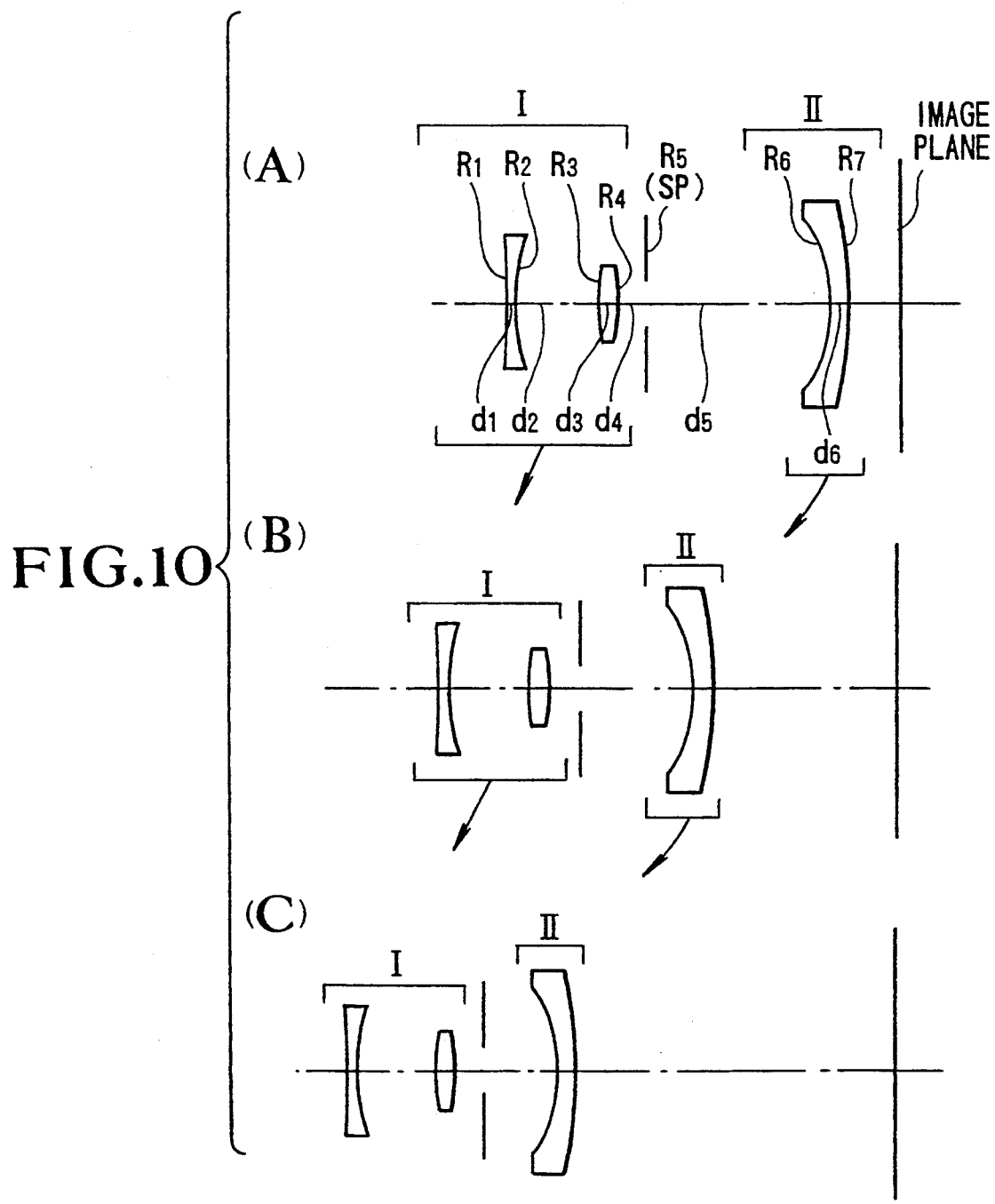
Figure 11A:
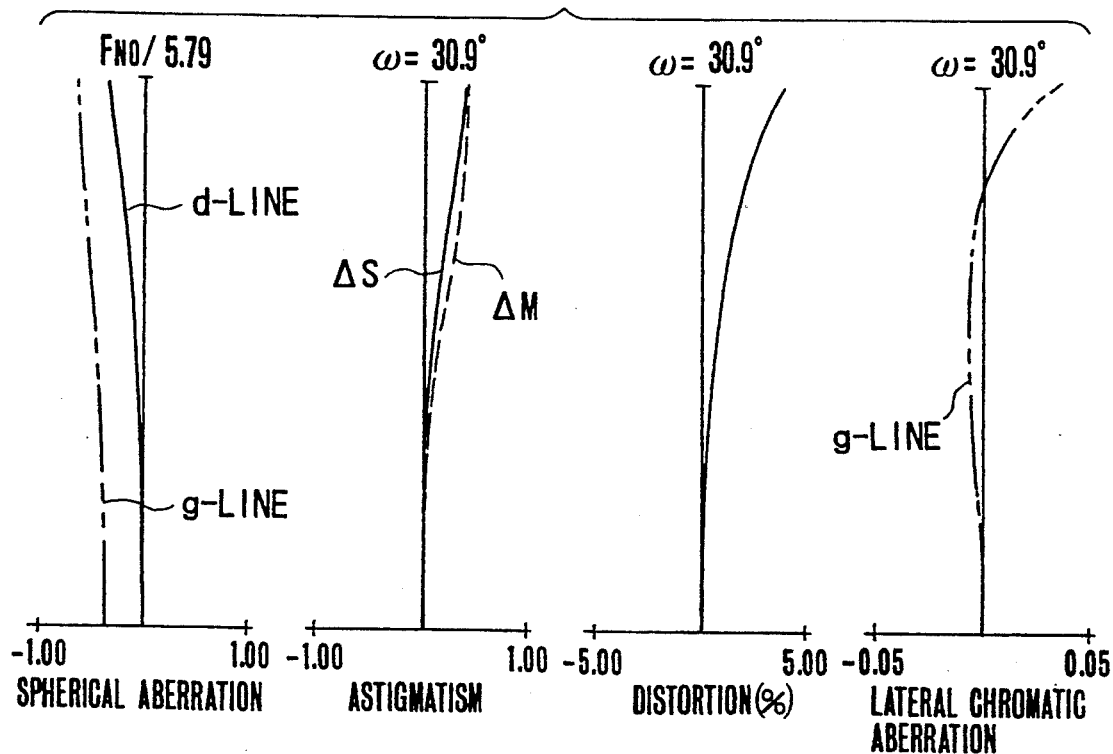
Figure 11B:
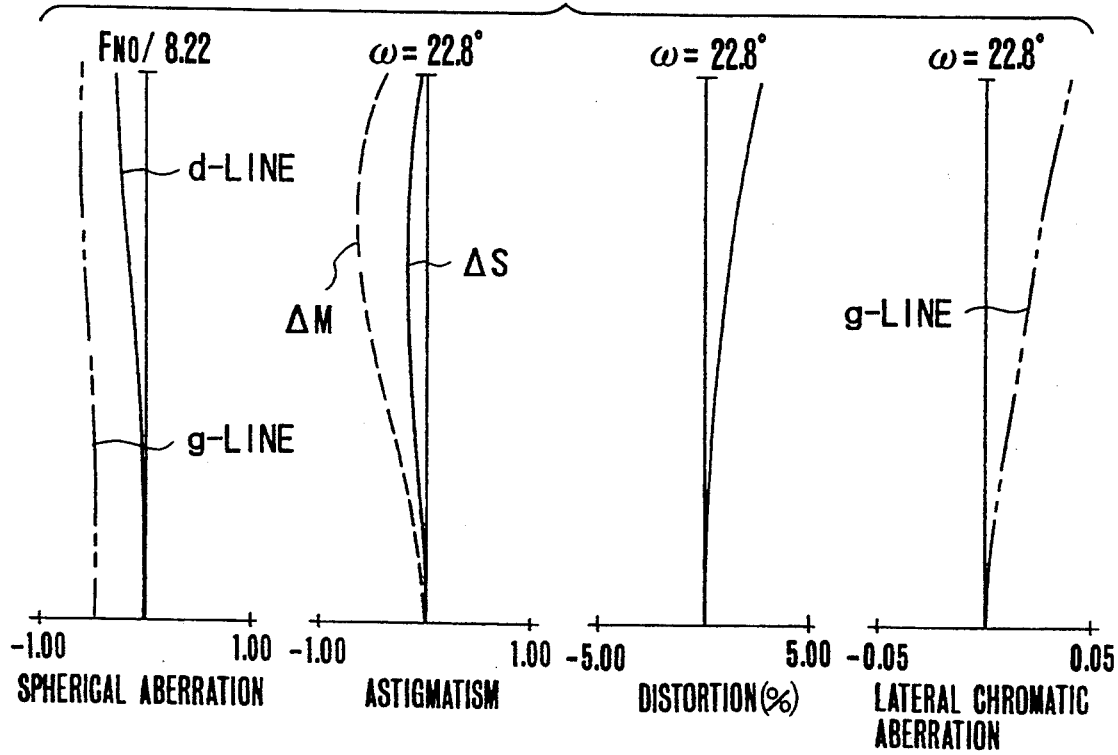
Figure 11C:
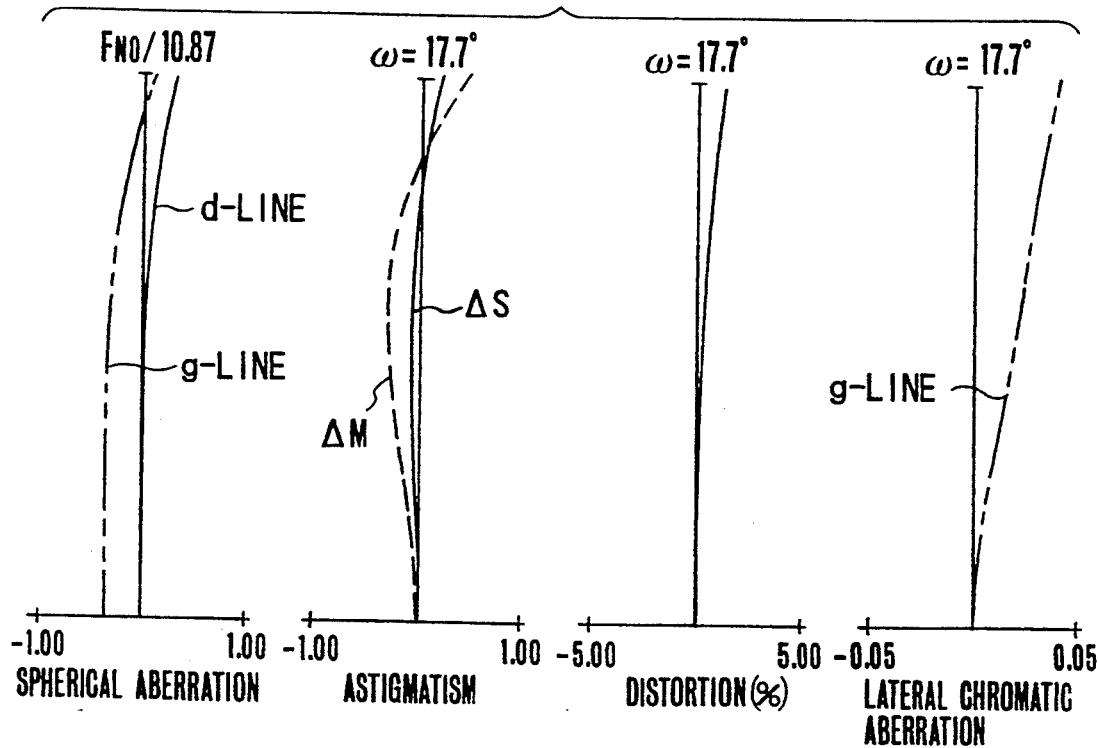
Figure 12A:
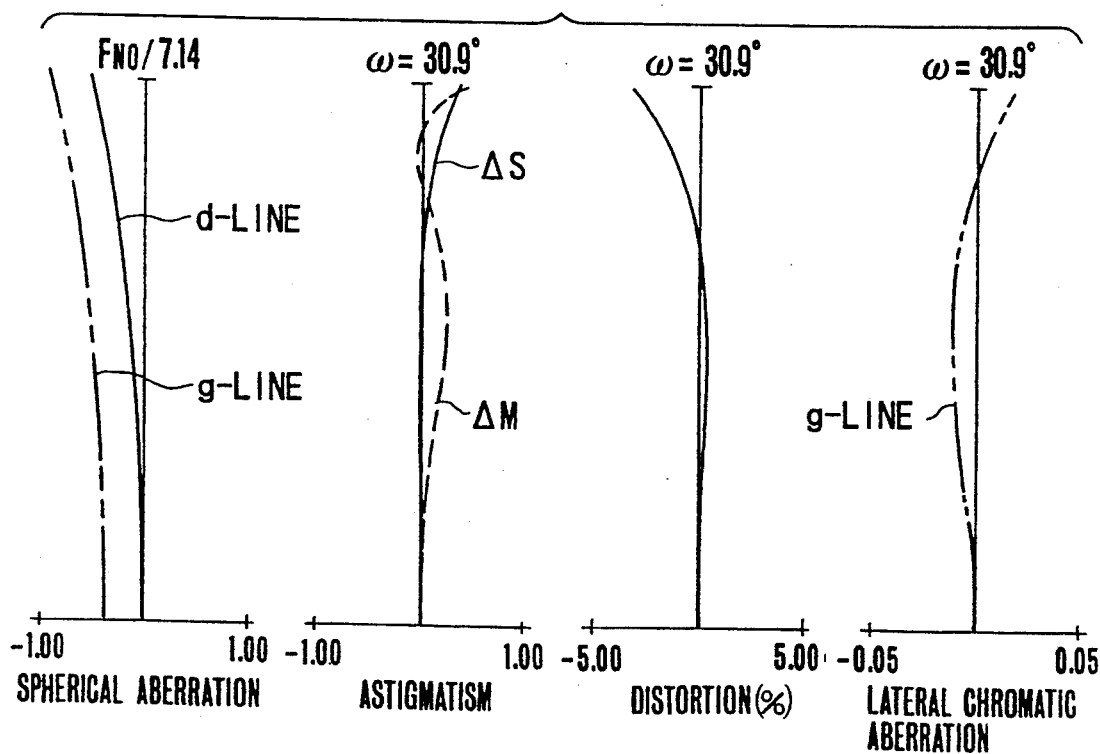
Figure 12B:
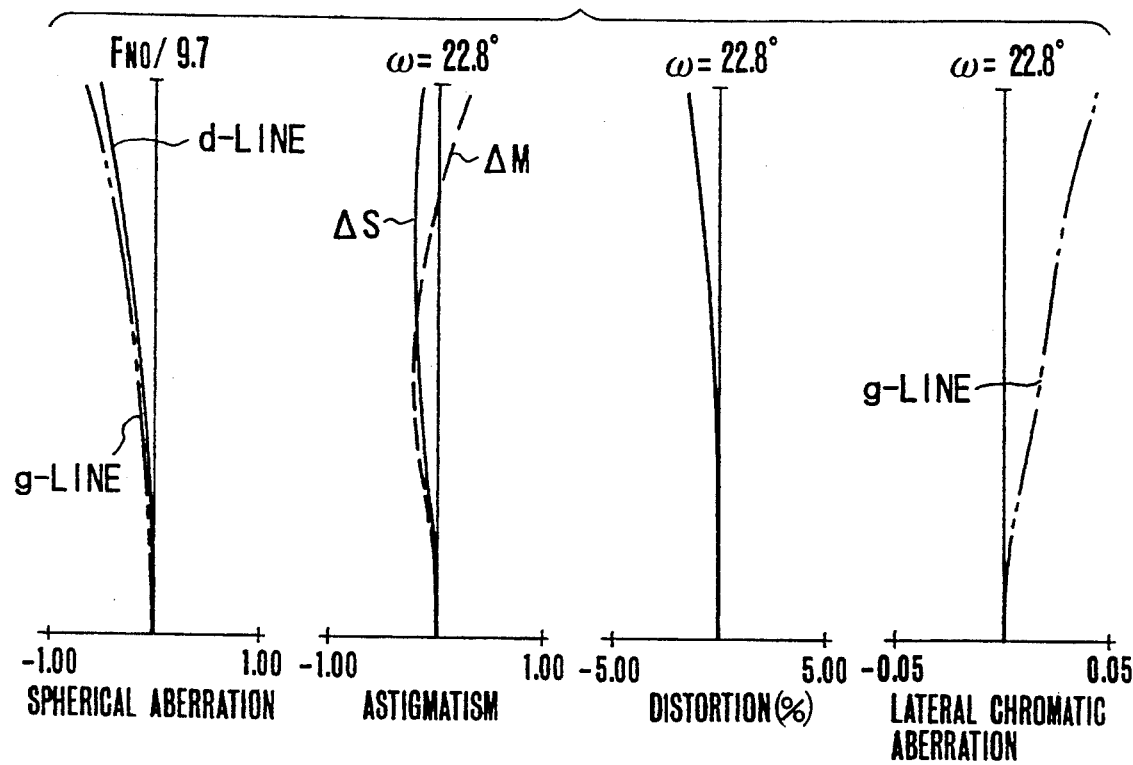
Figure 12C:
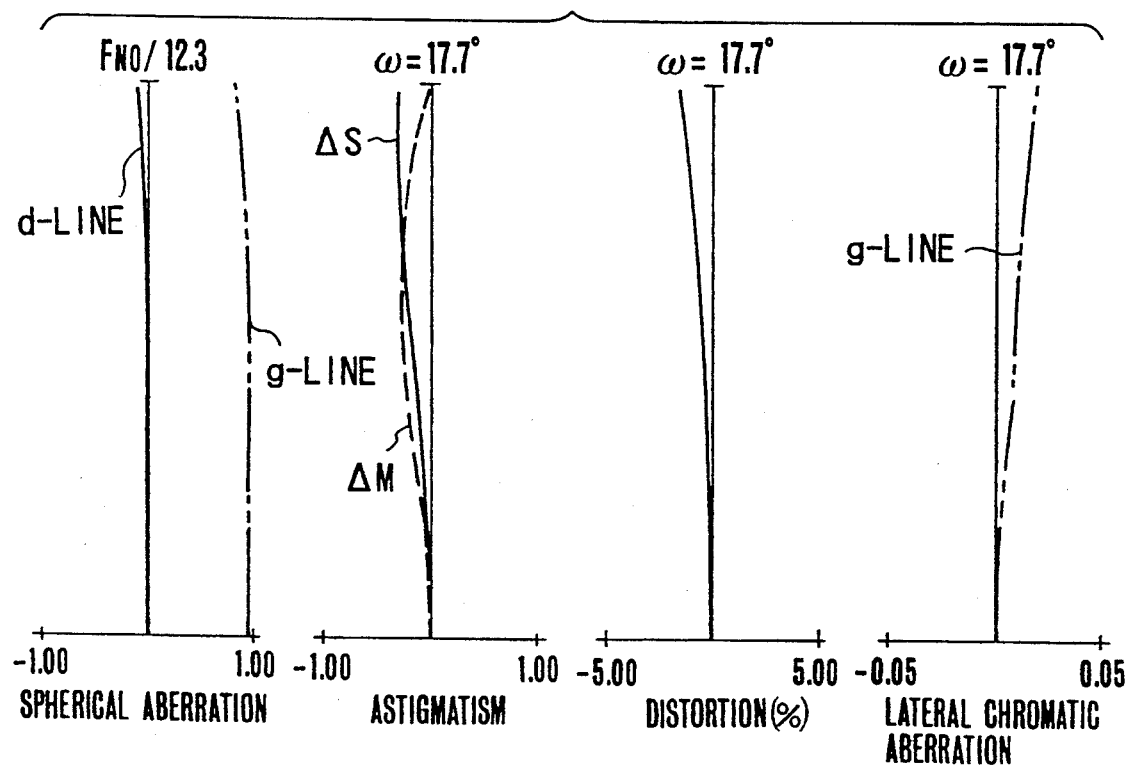

Finally, now the total number of lens elements may be reduced to three while as high a zoom ratio as 2 can be attained. In this connection, another embodiment is described by reference to FIG. 9 and FIG. 10 below.

In this embodiment, the first lens unit I is constructed from a negative first lens and a positive second lens in this order from the front, and the second lens unit II is constructed only from a negative third lens. Further specifically speaking, the first lens is formed either to a meniscus shape convex toward the object side, or to a bi-concave shape, and the second lens is formed to a bi-convex form, these lenses satisfying the following conditions:

$$0.1 < d_{1-2}/FW < 1.5 \tag{14}$$

$$50 < \nu 12 \tag{15}$$

where $d_{1-2}$ is the air separation between the first lens and the second lens, ν12 is the Abbe number of the material of the second lens, and FW is the shortest focal length of the entire lens system.

By this, a good optical performance is maintained over an entire zooming range in a zoom lens of simple form having a zoom ratio of about 2 and the photographic image angle 62° to 35° or thereabout with the limitation of the total number of lens elements to three.

The technical significance of each of the above-described conditions (14) and (15) is explained below.

The inequalities of condition (14) are concerned with the air separation between the first and second lenses in the first lens unit and have a chief aim to well correct off-axial aberrations with the limitation of the size of the entire lens system to a minimum.

When the air separation is too narrow as exceeding the lower limit of the condition (14), it becomes difficult to maintain good stability of field curvature throughout the entire zooming range.

When the air separation is too wide as exceeding the upper limit, the effective diameter of the first lens increases largely, and the bulk and size of the entire lens system come to increase objectionably.

The inequality of condition (15), when the first lens unit is constructed with the negative lens and the positive lens, gives a proper range for the Abbe number of the material of the positive or second lens and has a chief aim to well correct longitudinal chromatic aberration. When the condition (15) is violated, the longitudinal chromatic aberration in the wide-angle end exceeds the acceptable level.

In addition to these, what is particularly favorable to the aberration correction in the present embodiment is to set forth the following condition:

$$0.8 < (RB+RA)/(RB-RA) < 1.9 \tag{16}$$

where RA and RB are the radii of curvature of the front and rear surfaces of the third lens constituting the second lens unit of negative refractive power respectively.

The inequalities of condition (16) have an aim to correct all the aberrations over the entire area of the image frame in good balance over the entire zooming range. When either of the upper and lower limits is exceeded, it becomes difficult to maintain the optical performance of the whole image frame in good balance.

To improve the variation of aberrations with zooming while still maintaining the minimization of the bulk and size of the entire lens system to be achieved, the present embodiment sets forth another conditions for the focal lengths F1 and F2 of the first and second lens units respectively and the principal point intervals eW and eT between the first lens unit and the second lens unit in the wide-angle end and the telephoto end respectively as follows:

$$0.6 < |F1/F2| < 1.2 \quad (17)$$

$$1.7 < eW/eT < 2.8 \quad (18)$$

The inequalities of condition (17) are concerned with the ratio of the refractive powers of the first lens unit and the second lens unit and, as both lens units are made to move to effect zooming, have an aim to minimize the range of variation of aberrations while preserving the prescribed zoom ratio.

When one of the refractive powers of the first lens unit and the second lens unit increases relative to the other as exceeding the upper limit or the lower limit of the condition (17), it becomes difficult to well correct variation of aberrations while preserving the prescribed zoom ratio.

The inequalities of condition (18) give a proper range for the principal intervals between the first lens unit and the second lens unit in the wide-angle end and the telephoto end and have an aim that within the framework of the condition (17), a certain value of the zoom ratio, for example, 2 or thereabout, is obtained while maintaining a shortening of the total length of the entire lens system to be achieved.

When the upper limit or the lower limit of the condition (18) is exceeded, it becomes difficult to obtain the prescribed zoom ratio while maintaining the shortening of the total length of the entire lens system to be achieved.

Besides these, in the present embodiment, to maintain good stability of optical performance over the entire area of the image frame and over the entire zooming range, it is recommended to apply to the front side or rear side of the first lens in the first lens unit an aspheric surface satisfying the following condition:

$$1 < |B \cdot Y^3| < 15 \quad (19)$$

where B is the 4th-order aspheric coefficient of the aspheric surface, and Y is the diagonal length of the effective image frame.

Here, when the aspheric surface is applied to the front lens surface of the first lens, the aspheric coefficient B takes negative sign, and when to the rear lens surface, the aspheric coefficient B takes positive sign.

When the upper limit of the condition (19) is exceeded, the aspheric surface produces an insufficient effect and, therefore, it becomes difficult to correct field curvature well. When the lower limit is exceeded, the effect of the aspheric surface becomes too strong to avoid over-correction of field curvature. So, that is not good.

It is to be noted that in the numerical examples 5 and 6 to be described below, the first lens is made from polycarbonate and formed to an aspheric lens, so that zoom lenses well corrected for field curvature are obtained.

The numerical data for the examples 5 and 6 of zoom lenses of the invention are given below.

Also, the values of the factors in the above-described conditions (14) to (19) for the numerical examples 5 and 6 are listed in Table-3.

| Numerical Example 5 (FIGS. 9, 11(A), 11(B) and 11(C)) | | | | |
|---|---|---|---|---|
| F = 39.19 − 67.72 | FNo = 1:5.79 − 10.87 | 2ω = 61.73° − 35.43° | | |
| *R 1 = | 20.90 | d 1 = | 1.5 | N 1 = 1.58306 ν 1 = 30.2 |
| R 2 = | 14.61 | d 2 = | 8.45 | |
| R 3 = | 200.48 | d 3 = | 3.0 | N 2 = 1.49700 ν 2 = 81.6 |
| R 4 = | −12.61 | d 4 = | 1.0 | |
| R 5 = | (Stop) | d 5 = | Variable | |
| R 6 = | −17.77 | d 6 = | 1.7 | N 3 = 1.60311 ν 3 = 60.7 |
| R 7 = | 1252.95 | | | |

| Lens Separation during Zooming | | | |
|---|---|---|---|
| Focal Length | 36.20 | 51.40 | 67.73 |
| d5 | 24.83 | 17.92 | 13.95 |

First Surface: Aspheric Surface; Aspheric Coefficients
A = 0
B = −9.01 × 10⁻⁵
C = −9.3 × 10⁻⁷
D = 2.12 × 10⁻⁹
E = −7.43 × 10⁻¹¹

| Numerical Example 6 (FIGS. 10, 12(A), 12(B) and 12(C)) | | | | |
|---|---|---|---|---|
| F = 39.29 − 67.7 | FNo = 1:7.14 − 12.32 | 2ω = 61.73° − 35.43° | | |
| *R 1 = | 600.08 | d 1 = | 1.5 | N 1 = 1.58376 ν 1 = 30.2 |
| R 2 = | 34.81 | d 2 = | 11.9 | |
| R 3 = | 32.30 | d 3 = | 3.0 | N 2 = 1.48749 ν 2 = 70.2 |
| R 4 = | −20.42 | d 4 = | 4.34 | |
| R 5 = | (Stop) | d 5 = | Variable | |
| R 6 = | −18.81 | d 6 = | 1.7 | N 3 = 1.58376 ν 3 = 30.2 |
| R 7 = | −68.57 | | | |

| Lens Separation during Zooming | | | |
|---|---|---|---|
| Focal Length | 39.29 | 53.44 | 67.70 |
| d5 | 27.76 | 17.78 | 11.93 |

First Surface: Aspheric Surface; Aspheric Coefficients
A = 0
B = −4.60 × 10⁻⁵
C = −9.17 × 10⁻⁸
D = 1.06 × 10⁻⁹
E = −1.22 × 10⁻¹¹

Sixth Surface: Aspheric Surface; Aspheric Coefficients
A = 0
B = −5.31 × 10⁻⁶
C = −2.02 × 10⁻⁷
D = 1.82 × 10⁻⁹
E = −3.62 × 10⁻¹²

TABLE 3

| Condition No. | Factor | Numerical Example 5 | Numerical Example 6 |
| --- | --- | --- | --- |
| (14) | $d_{1-2}/FW$ | 0.23 | 0.3 |
| (15) | $\nu 12$ | 81.6 | 70.2 |
| (16) | $\dfrac{RB + RA}{RB - RA}$ | 0.97 | 1.76 |
| (17) | $\|F1/F2\|$ | 1.00 | 0.72 |
| (18) | $eW/eT$ | 1.87 | 2.61 |
| (19) | $\|B \cdot Y^3\|$ | 7.30 | 3.73 |

As has been described above, according to the invention, as two lens units of prescribed refractive powers axially movable for zooming constitute a complete zoom lens, the rules of design for the form and the construction and arrangement of the lens elements of each of the lens units are set forth as have been defined before, thereby making it possible to provide the zoom lens with a minimized total length of the entire system and a reduced total number of lens elements, while still permitting a high zoom ratio to be obtained an a high optical performance to be maintained throughout the entire zooming range.

What is claimed is:

1. A zoom lens consisting of lens units whose constituent lens elements are less than or equal to four in total number, comprising:
   a first lens unit having a positive refractive power;
   a second lens unit having a negative refractive power; and
   a diaphragm arranged between the first lens unit and the second lens unit,
   wherein the magnification is varied by varying the air separation between said first lens unit and said second lens unit, and said first lens unit has an aspheric surface applied to the front surface thereof.

2. A zoom lens according to claim 1, wherein said first lens unit consists of, from front to rear, a first lens having a negative refractive power and a second lens having a positive refractive power, and said second lens unit consists of, form front to rear, a third lens having a positive refractive power and a fourth lens having a negative refractive power, and wherein, letting the focal lengths of said first lens unit and said second lens unit be denoted by F1 and F2 respectively, the Abbe numbers of the materials of said first lens and said second lens by $\nu 11$ and $\nu 12$ respectively, and the shortest focal length of the entire lens system by FW, the following conditions are satisfied:

$$0.4 < F1/FW\ 1.2$$

$$-1.5 < F2/FW < -0.5$$

$$\|\ 11\ 40$$

$$50 < \nu 12$$

3. A zoom lens according to claim 2, further satisfying the following conditions:

$$1.56 < n11 < 1.65$$

$$n12 < 1.52$$

where n11 and n12 are the refractive indices of the materials of said first lens and said second lens respectively.

4. A zoom lens according to claim 3, further satisfying the following condition:

$$0.3 < (RB+RA)/(RB-RA) < 1.2$$

where RA and RB are the radii of curvature of the front and rear surfaces of said fourth lens respectively.

5. A zoom lens according to claim 2, further satisfying the following condition:

$$1 < |B \cdot Y^3| < 15$$

where B is the 4th-order aspheric coefficient of said aspheric surface of said first lens, and Y is the diagonal length of the effective image frame.

6. A zoom lens according to claim 2, further satisfying the following condition:

$$1.7 < eW/eT < 2.7$$

where eW and eT are the intervals between the principal points of said first lens unit and said second lens unit in the wide-angle end and the telephoto end respectively.

7. A zoom lens according to claim 1, wherein said first lens unit consists of a negative first lens and a positive second lens, and said second lens unit consists of a negative third lens.

8. A zoom lens according to claim 7, wherein said second lens is constructed in bi-convex form, and satisfying the following conditions:

$$0.1 < d_{1-2}/FW < 1.5$$

$$50 < \theta 12$$

where $d_{1-2}$ is the air separation between said first lens and said second lens, $\nu 12$ is the Abbe number of the material of said second lens, and FW is the shortest focal length of the entire lens system.

9. A zoom lens according to claim 8, further satisfying the following condition:

$$0.8 < (RB+RA)/(RB-RA) < 1.9$$

where RA and RB are the radii of curvature of the front and rear surfaces of said third lens respectively.

10. A zoom lens according to claim 9, further satisfying the following conditions:

$$0.6 < |F1/F2| < 1.2$$

$$1.7 < eW/eT < 2.8$$

where F1 and F2 are the focal lengths of said first lens unit and said second lens unit respectively, and eW and eT are the intervals between the principal points of said first lens unit and said second lens unit in the wide-angle end and the telephoto end respectively.

11. A zoom lens according to claim 7, satisfying the following condition:

$$1 < |B \cdot Y^3| < 15$$

where B is the 4th-order aspheric coefficient of said aspheric surface of said first lens, and Y is the diagonal length of the effective image frame.

12. A zoom lens according to claim 1, wherein said first lens unit consists of a negative first lens, a positive second lens and a positive third lens, and said second lens unit consists of a fourth lens unit, and wherein, letting the i-th axial lens thickness or air separation, when counted from the front, in the wide-angle end be denoted by Di and the shortest focal length of the entire lens system by FW, the following condition is satisfied:

$$0.1 < (D3+D4+D5)/FW < 0.5$$

13. A zoom lens according to claim 12, further satisfying the following condition:

$$0.06 < (D1+D2)/FW < 0.7$$

14. A zoom lens according to claim 12, further satisfying the following condition:

$$0.1 D6T/FW < 0.6$$

where D6T is the axial air separation between said first lens unit and said second lens unit in the telephoto end.

15. A small-sized zoom lens comprising, from front to rear, first lens unit of positive refractive power and a second lens unit of negative refractive power, totaling two lens units, said first lens unit consisting of a negative first lens and a positive second lens, said second lens unit being consisting of a positive third lens and a negative fourth lens, and the air separation between said first lens unit and said second lens unit being varied to effect zooming, wherein, letting the focal lengths of said first lens unit and said second lens unit be denoted by F1 and F2 respectively, the Abbe numbers of the materials of said first lens and said second lens by $\nu 11$ and $\nu 12$ respectively, and the shortest focal length of the entire lens system by FW, the following conditions are satisfied:

$$0.4 < F1/FW < 1.2$$

$$-1.5 < F2/FW < -0.5$$

$$\nu 11 < 40$$

$$50 < \nu 12$$

16. A zoom lens according to claim 15, further satisfying the following conditions:

$$1.56 < n11 < 1.65$$

$$n12 < 1.52$$

where n11 and n12 are the refractive indices of the materials of said first lens and said second lens respectively.

17. A zoom lens according to claim 16, further satisfying the following condition:

$$0.3 < (RB+RA)/(RB-RA) < 51.2$$

where RA and RB are the radii of curvature of the front and rear surfaces of said fourth lens respectively.

18. A zoom lens according to claim 17, wherein said first lens has an aspheric surface applied to the front or rear surface thereof, and satisfying the following condition:

$$1 < |B \cdot Y^3| < 15$$

where B is the 4th-order aspheric coefficient of said aspheric surface of said first lens, and Y is the diagonal length of the effective image frame.

19. A zoom lens according to claim 18, further satisfying the following condition:

$$1.7 < eW/eT < 2.7$$

where eW and eT are the intervals between the principal points of said first lens unit and said second lens unit in the wide-angle end and the telephoto end respectively.

20. A small-sized zoom lens comprising, from front to rear, a first lens unit of positive refractive power and a second lens unit of negative refractive power, totaling two lens units, said first lens unit consisting of a negative first lens and a positive second lens, said second lens unit consisting of a negative third lens, and the air separation between said first and second lens units being varied to effect zooming.

21. A zoom lens according to claim 20, wherein said second lens is constructed in bi-convex form, and wherein, letting the axial air separation between said first lens and said second lens be denoted by $d_{1-2}$, the Abbe number of the material of said second lens by $\nu 12$ and the shortest focal length of the entire lens system by FW, the following conditions are satisfied:

$$0.1 < d_{1-2}/FW < 1.5$$

$$50 < \nu 12$$

22. A zoom lens according to claim 21, further satisfying the following condition:

$$0.8 < (RB+RA)/RB-RA) < 1.9$$

where RA and RB are the radii of curvature of the front and rear surfaces of said third lens respectively.

23. A zoom lens according to claim 22, further satisfying the following conditions:

$$0.6 < |F1/F2| < 1.2$$

$$1.7 < eW/eT < 2.8$$

where F1 and F2 are the focal lengths of said first lens unit and said second lens unit respectively, and eW and eT are the intervals between the principal points of said first lens unit and said second lens unit in the wide-angle end and the telephoto end respectively.

24. A zoom lens according to claim 20, wherein said first lens has an aspheric surface applied to the front or rear surface thereof, and satisfying the following condition:

$$1 < |B \cdot Y^3| < 15$$

wherein B is the 4th-order aspheric coefficient of said aspheric surface of said first lens, and Y is the diagonal length of the effective image frame.

25. A small-sized zoom lens comprising, from front to rear, a first lens unit of positive refractive power and a second lens unit of negative refractive power, totaling two lens units, said first lens unit consisting of a negative first lens, a positive second lens and a positive third lens, totaling three lenses, said second lens unit consisting of a negative fourth lens, and the air separation between said first and second lens units being varied to effect zooming, wherein, letting the i-th axial lens thickness or air separation, when counted from the front, in the wide-angle end be denoted by Di, and the shortest focal length of the entire lens system by FW, the following condition is satisfied:

$$0.1 < (D3+D4+D5)/FW < 0.5$$

26. A zoom lens according to claim 25, further satisfying the following condition:

$$0.06 < (D1+D2)/FW < 0.7$$

27. A zoom lens according to claim 25, further satisfying the following condition:

$$0.1 < D6T/FW < 0.6$$

where D6T is the axial air separation between said first lens unit and said second lens unit in the telephoto end.

* * * * *

UNITED STATES PATENT AND TRADEMARK OFFICE
CERTIFICATE OF CORRECTION

PATENT NO. : 5,218,478
DATED : June 8, 1993
INVENTOR(S) : YOSHINORI ITOH

It is certified that error appears in the above-indentified patent and that said Letters Patent is hereby corrected as shown below:

Column 2:
    Line 8, "kept hold of," should read --obtained--.
    Line 59, "-1.5 < F2/FW < -0.5 em" should read
-- -1.5 < F2/FW < -0.5--.

Column 3:
    Line 50, "lend" should read --end--

Column 5:
    Line 16, "$x = \frac{(1/R)H^2}{1 + \sqrt{1-(H/R)^2} + DH^8 + EH^{10}} + AH^2 + BH^4 + CH^6$"

should read --$x = \frac{(1/R)H^2}{1 + \sqrt{1-(H/R)^2}} + AH^2 + BH^4 + CH^6 + DH^8 + EH^{10}$--.

Line 24, "(19)" should read --(9)--.

Column 6:
    Table 1, "(18)" should read --(8)--.

Column 8:
    Line 55, "int he" should read --in the--.

Column 9:
    Line 54, "$50 < \mu 12$" should read --$50 < \upsilon 12$--.

UNITED STATES PATENT AND TRADEMARK OFFICE
CERTIFICATE OF CORRECTION

PATENT NO. : 5,218,478

DATED : June 8, 1993

INVENTOR(S) : YOSHINORI ITOH

It is certified that error appears in the above-identified patent and that said Letters Patent is hereby corrected as shown below:

Column 10:
  Line 66, "another" should read --additional--.

Column 13:
  Line 44, "form" should read --from--.
  Line 60, "|| 11 40" should read --υ11 < 40--.

Column 14:
  Line 47, "50 < Θ12" should read --50 < υ12--.

Column 15:
  Line 47, "being" should be deleted.

Column 16:
  Line 17, "0.3 < (RB+RA)/(RB-RA) < 51.2" should read --0.3 < (RB+RA)/(RB-RA) < 1.2--.

Column 17:
  Line 1, "0.8 < (RB+RA)/RB-RA) < 1.9" should read --0.8 < (RB+RA)/(RB-RA) < 1.9--.

Signed and Sealed this

Tenth Day of May, 1994

Attest:

BRUCE LEHMAN

*Attesting Officer*  *Commissioner of Patents and Trademarks*